United States Patent [19]
Tamai et al.

[11] Patent Number: 6,035,282
[45] Date of Patent: Mar. 7, 2000

[54] INFORMATION PROCESSING APPARATUS AND METHOD UTILIZING USEFUL ADDITIONAL INFORMATION PACKET

[75] Inventors: Ryo Tamai, Kawasaki; Hirofumi Endo, Fujisawa; Mitsuaki Takeuchi; Reiko Itoh, both of Yokohama; Jun Ebata, Kashiwa, all of Japan

[73] Assignee: Ricoh Company, Ltd., Tokyo, Japan

[21] Appl. No.: 09/133,515

[22] Filed: Aug. 12, 1998

Related U.S. Application Data

[63] Continuation of application No. 08/012,462, Feb. 2, 1993, Pat. No. 5,819,235.

[30] Foreign Application Priority Data

| Feb. 4, 1992 | [JP] | Japan | 4-47620 |
| Feb. 20, 1992 | [JP] | Japan | 4-70151 |
| Feb. 26, 1992 | [JP] | Japan | 4-39395 |
| Oct. 26, 1992 | [JP] | Japan | 4-287726 |

[51] Int. Cl.$^7$ ..................................................... G06F 7/00

[52] U.S. Cl. .............................. 705/23; 382/175; 382/306

[58] Field of Search .............................. 705/23; 382/175, 382/306, 6, 48, 61, 100, 112, 133, 163, 190, 312, 318; 395/161, 162; 358/434, 438, 444; 707/500, 540, 104

[56] References Cited

U.S. PATENT DOCUMENTS

| 4,760,606 | 7/1988 | Lesnick et al. | 382/48 |
| 4,980,842 | 12/1990 | Kamada et al. | 382/6 |
| 5,038,379 | 8/1991 | Sano | 382/1 |
| 5,274,468 | 12/1993 | Ojha | 382/61 |
| 5,339,412 | 8/1994 | Fueki | 382/61 |
| 5,369,716 | 11/1994 | Sangu | 382/61 |

FOREIGN PATENT DOCUMENTS

| 0 251 237 A2 | 1/1988 | European Pat. Off. . |
| 0 275 124 | 7/1988 | European Pat. Off. . |
| 0 315 425 A2 | 5/1989 | European Pat. Off. . |
| 0 315 426 A2 | 5/1989 | European Pat. Off. . |
| 3824976 A1 | 2/1989 | Germany . |
| 59-36867 | 2/1984 | Japan . |
| 62-36583 | 8/1987 | Japan . |
| 3-41559 | 2/1991 | Japan . |
| WO 91/06052 | 5/1991 | WIPO . |

*Primary Examiner*—Frantzy Poinvil
*Attorney, Agent, or Firm*—McDermott, Will & Emery

[57] ABSTRACT

An attaching unit attaches an additional-information packet to a collection of main information, wherein the additional-information packet comprises sensory information corresponding to sensory impressions of a human being that has processed the collection of main information, the sensory impressions being with respect to circumstances under which the collection of main information has been processed.

31 Claims, 26 Drawing Sheets

FIG.10A

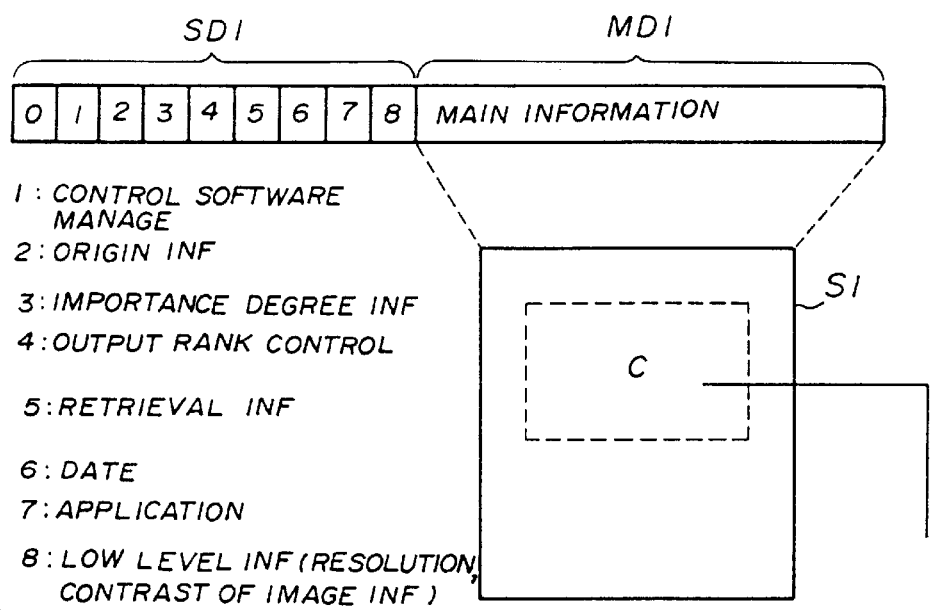

SD1 | MD1
0 1 2 3 4 5 6 7 8 | MAIN INFORMATION

1 : CONTROL SOFTWARE MANAGE
2 : ORIGIN INF
3 : IMPORTANCE DEGREE INF
4 : OUTPUT RANK CONTROL
5 : RETRIEVAL INF
6 : DATE
7 : APPLICATION
8 : LOW LEVEL INF (RESOLUTION, CONTRAST OF IMAGE INF)

FIG.10B

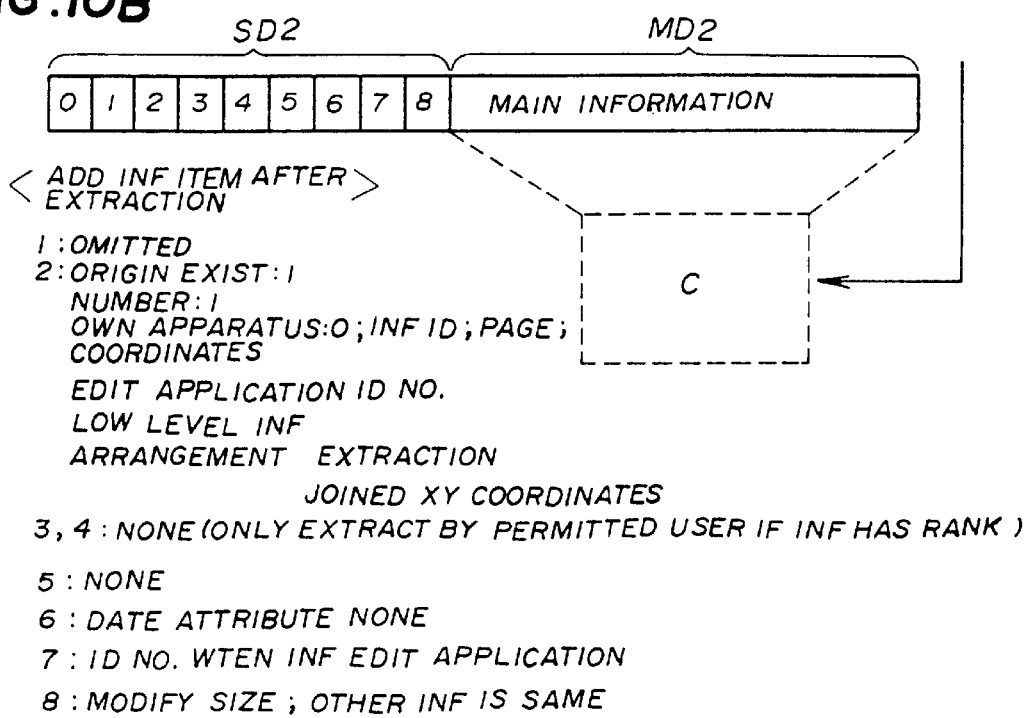

SD2 | MD2
0 1 2 3 4 5 6 7 8 | MAIN INFORMATION

< ADD INF ITEM AFTER EXTRACTION >

1 : OMITTED
2 : ORIGIN EXIST : 1
   NUMBER : 1
   OWN APPARATUS : 0 ; INF ID ; PAGE ; COORDINATES
   EDIT APPLICATION ID NO.
   LOW LEVEL INF
   ARRANGEMENT EXTRACTION
         JOINED XY COORDINATES
3, 4 : NONE (ONLY EXTRACT BY PERMITTED USER IF INF HAS RANK)
5 : NONE
6 : DATE ATTRIBUTE NONE
7 : ID NO. WTEN INF EDIT APPLICATION
8 : MODIFY SIZE ; OTHER INF IS SAME

FIG.13

IMPORTANCE DEGREE

| A | B | C | D | | | | | | | |
|---|---|---|---|---|---|---|---|---|---|---|

FIG.14

OUTPUT RANK CONTROL

| A | B | C | D | | | | | | | |
|---|---|---|---|---|---|---|---|---|---|---|

FIG.15

RETRIEVAL INFORMATION

| A | B | C | D | E | F | G | H | I | | | |

FIG.16

DATE

| A | B | | | | | | | | | | |

FIG. 17

APPLICATION

| A | B | C | D | E | F | G | H | I | | |

FIG. 18

LOW LEVEL INF

| A | B | C | D | E | F | G | H | I | | |

FIG. 22

REFERENCE INF : INF IN RECTANGLES IS REFERENCE INF

| (1) | (2) | (3) | (4) | (5) |

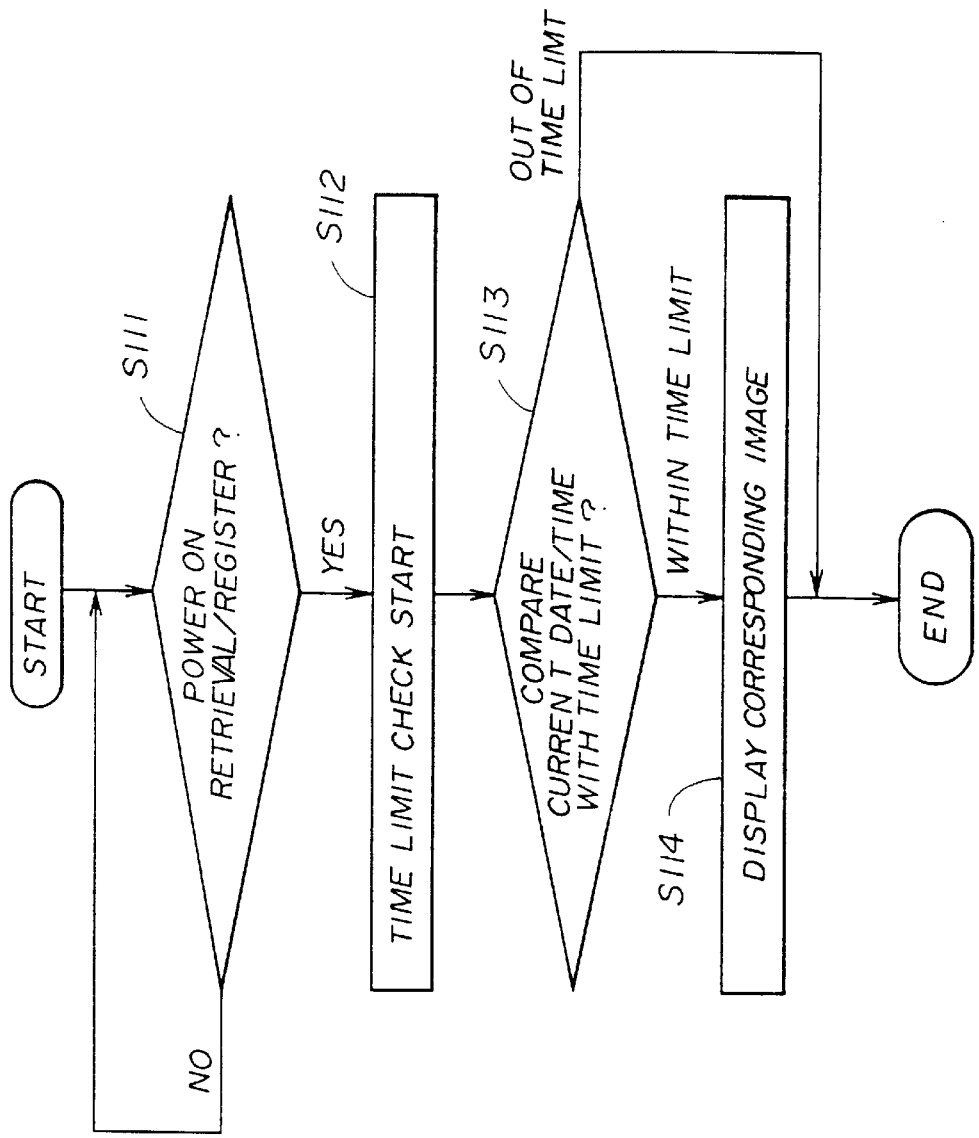

INFORMATION PROCESSING APPARATUS AND METHOD UTILIZING USEFUL ADDITIONAL INFORMATION PACKET

This application is a continuation of application Ser. No. 08/012,462 filed Feb. 2, 1993 now U.S. Pat. No. 5,819,235.

BACKGROUND OF THE INVENTION

The present invention relates to an information processing apparatus and a method appropriate for being applied to an electronic filing apparatus, a DTP (desk top publishing) system, and other similar systems. In these systems, the apparatus and method according to the present invention are utilized for producing a file of information, for sorting the produced files of information, for retrieval of the produced files of information, and for other similar information processing.

Such electronic filing apparatuses, being employed currently, will now be described. An object of the electronic filing apparatus is to greatly reduce space for storing documents that are produced and received by offices, factories, laboratories, schools, and other similar places. Another object of the electronic filing apparatus is to facilitate usage by many people of information described in the documents. To achieve the above objects, the electronic filing apparatus converts image information of information in the documents, including characters, figures, photographs, and other information, to electric signals. The electronic filing apparatus then stores these electric signals in an information storing medium having a very large capacity, such as, for example, one, or a plurality of magnetic discs, optical discs, magneto-optical discs and other similar media. In the storing process, document names or other identification codes for each of the documents, which documents are converted into electric signals, are registered, correspondingly to conversion of the respective documents, so as to be able to retrieve the registered documents afterward.

A general hardware configuration of such an electronic filing apparatus will now be described with reference to FIG. 2.

An information processing unit (main element) 1 processes image information and sorting and retrieval information. The operator, by operating a keyboard 2, inputs command information and other necessary information to the processing unit 1. A scanner 3 is used for inputting image information, such as that described in documents, into the processing unit 1. An indicating unit 4, employing a CRT or another similar device, is used for displaying image information thereon. A printer 5, employing a laser printer or another similar device, is used for printing image information which has been processed by the processing unit 1, so as to output the image information. A communication unit 6 transmits/receives image information through a communication line such as a LAN, a public communication line or another communication line.

The information processing unit 1 includes: a computer (not shown in FIG. 2) employing a CPU, a ROM, a RAM, and other devices; a magnetic disc device (HD, hard disc) 7 for storing a retrieval database; and an optical disc driving device (ODD) 8 for reading data to and writing data from an optical disc (magneto-optical disc) 9 capable of having data written thereto and of having data read data therefrom.

An operating flow in the above-mentioned electronic filing apparatus will now be described, in a case where image information (image data) is registered therein. The image information is read through the scanner 3, or the communication unit 6. The read image information is then displayed on the screen of the indicating unit 4.

Then, after the operator acknowledges the image information displayed on the screen, the operator pushes an acknowledgement key located on the keyboard 2. Thus, the optical disc driving device 8 reads the image information from and writes it on the optical disc (magneto-optical disc).

A retrieval information used for retrieving image information having been written on the optical disc (magneto-optical disc) 9 is simultaneously written on the magnetic disc (HD). The retrieval information may be simultaneously written on the optical disc (magneto-optical disc) 9, instead, depending on the case.

Normally, the retrieval information is written once on the magnetic disc employed by the magnetic disc device 7 once. And afterward, when the optical disc (magneto-optical disc) 9 is taken out from the information processing unit 1, the retrieval information, after being read from the magnetic disc, is written on the optical disc (magneto-optical disc) 9. Processes, such as reading the retrieval information from the magnetic disc and writing it onto the optical disc (magneto-optical disc) 9 at the time when the optical disc (magneto-optical disc) 9 is taken out, are executed as a normal routine "taking out processes".

In the above-mentioned case, the image information and the corresponding retrieval information are registered separately either on the optical disc (magneto-optical disc) 9 or on the magnetic disc employed in the information processing unit 1. This image information and the corresponding retrieval information are related to each other by means of a corresponding identification number (hereinafter, the expression "identification number" will be abbreviated "ID number").

Methods for outputting image information from the processing unit 1, that is, of taking information out from the electronic filing apparatus are as mentioned above: taking out the optical disc (magneto-optical disc) 9 on which the image information is written; taking out paper on which the image information is printed; and transmitting through the communication unit 6 via the communication line.

In a case where the image information output using either the printed paper or though the communication line, and wherein only image information is output, that is, wherein no additional information such as the corresponding retrieval information or other additional information, if it exists, is output, there does not occur a problem regarding system incompatibility, which problem may occur, for example, because of a difference in read/write systems between a writing apparatus and a reading apparatus. In this case, the additional information, which is written on the magnetic disc, is not output with the image information originally written on the optical disc (magneto-optical disc).

On the other hand, in the case where the image information is output by taking out the optical disc (magneto-optical disc), the above-mentioned problem regarding system incompatibility may occur. That is, the information written on the optical disc (magneto-optical disc) cannot be read unless the problem regarding system incompatibility is solved so as to enable of reading information, for example, in the application level, such as the retrieval information corresponding to the image information to be read. The above information of the application level is such as, for example, information used when the application is executed. Such a problem occurring as a result of device differences may be solved by standardizing read/write systems between the apparatus having previously processed the image information and then written it to the optical disc (magneto-optical disc) and the other apparatus which reads the image data written on the optical disc (magneto-optical disc).

Functions executed by the information processing unit 1 of the above-mentioned electronic filing apparatus will now be detailed with reference to FIG. 3. Reference numerals given to blocks in FIG. 3 are the same as reference numerals given to corresponding blocks shown in FIG. 2. The CPU 10, a program memory (ROM) 11, an image memory (RAM) 12, and a video memory (video RAM) 13, respectively connected to each other via a bus-line 14, constitute the computer. In the example shown in FIG. 3, a mouse 15 acting as a pointing device is connected to the keyboard 2.

The program memory 8 stores therein software (programs): a program for the CPU 10 reading image information through an image reader such as the scanner 3 or another device; another program for causing the optical disc driving device 8 to write to the optical disc this image information as a file of information; another program for causing the optical disc driving device 8 to read information written therein; another program for sorting and/or retrieval of the image information; and other programs.

The operating flow in the case where the image information is registered will now be detailed. The image information read through scanner 3 or received through the communication unit 6 is stored once in the image memory 12. Simultaneously, low level information corresponding to the image information is further input as attached to the header of the image information. This low level information is scanner information indicating a tone, a resolution, a vertical or horizontal direction, and other information for the image information, then the image information is expanded in the image memory 12 according to the specifications specified by this low level information.

The information expanded in the image memory 12 is then expanded in the video memory 13, after being transferred thereto via the bus-line 14, so as to display the corresponding image information on the screen of the indicating unit 4. The operator, after acknowledging the image information on the screen, determines whether the image information is to be stored in the optical disc (magneto-optical disc) 9 or is to be deleted. When the operator determines the image information as information to be stored, the operator determines which attributes the image information is to be registered under, as a result of sorting.

In the above apparatus, the image information is stored in the image memory 12, while sorting information for this image information is stored in the magnetic disc apparatus 7. When the image information is registered in the optical disc (magneto-optical disc) 9 by the optical disc driving apparatus 8, only the image information is transferred from the image memory 12 to the optical disc (magneto-optical disc) 9. On the other hand, the low level information originally corresponding to the image information and the sorting and retrieval information for the image information are stored in the magnetic disc apparatus 7, without the corresponding low level information and sorting and retrieval information being transferred to the optical disc (magneto-optical disc) 9. Thus, the image information and the corresponding low level information and sorting and retrieval information are physically separated from each other.

The image information and the corresponding low level information and sorting and retrieval information are related to each other as a result of respective information having ID number.

Therefore, if an errors occurs in the magnetic disc apparatus 7, if for example the disc crashes, the corresponding sorting and retrieval information thus being lost, the image information accordingly cannot be read from the optical disc (magneto-optical disc) 9 when the image information written on the optical disc (magneto-optical disc) 9 is to be read by means of an electronic filing apparatus other than that which has written the image information on the optical disc (magneto-optical disc). Normally, in such an electronic filing apparatus, in order to prevent a problem such as explained above, after a predetermined period has being elapsed and/or when a predetermined condition occurs, a portion, or all of the sorting and retrieval information stored in the magnetic disc apparatus is transferred to the optical disc (magneto-optical disc) 9.

In this information transferring case, areas on the optical disc (magneto-optical disc) 9 are separated into an area for writing the image information thereto and another area for writing the sorting and retrieval information thereto. That is, the image information and the sorting and retrieval information are treated as separate information.

An operation flow in a case where the desired image information is to be obtained will now be described. A retrieval operation is started, the database stored in the magnetic disc apparatus 7 being thus searched by CPU 10. As a result of this search, the ID number is obtained indicating a place where the desired image information is stored.

Then, it is determined, by using the obtained ID number, whether or not image information having an ID number identical to the obtained ID number is stored in the optical disc (magneto-optical disc) 9 in which the image information has been stored. Then, after the desired image information is found, and the desired image information read, the CPU 10 then expands the desired image information in the image memory 12 according to the corresponding low level information, and the image information is then expanded in the video memory 13 so that the image information is displayed on the screen of the indication unit 4.

Such sorting and retrieval information (index information) will now be described. A keyword comprising character codes, date comprising numerals, a document number, an sorting table comprising ID numbers, and other means may be used. The sorting table may be alternatively formed two-dimensionally, and be then displayed on the CRT screen. In this method, respective positions on the table correspond to respective files of image information. Thus, as a result of the retrieval being executed visually, the retrieval operation becomes easier.

A method, such as, for example, disclosed in the Japanese Patent Publication No. 62-36583, will now be described. In the method, the sorting table is stored as an image, the sorting system and sorting precision can then be varied by varying the data of the sorting table.

Further, other methods such as, for example, disclosed in the Japanese Patent Laid-Opened Application No. 59-36867, the Japanese Patent Laid-Opened Application No. 3-41559, and other documents, will now be described. In these methods, a certain marker to be attached to the document may be registered, deleted, searched, printed, and processed in other ways. Functions of processing such a marker, such as functions as mentioned above, are carried out in an electronic filing apparatus. In these methods, a marker, instead of the document name, acts as identification information for retrieving the registered document, the name having been previously used for retrieving the desired document, so as to facilitate finding of the registered document or so as to facilitate finding of the desired part of the registered document.

Such an electronic filing apparatus involves the following problems.

(1) The electronic filing apparatus has a system for storing the image information as an image. Here, information as to the meaning that the image originally has may be separated from image information. Further, additional information, such as the above-mentioned sorting and retrieval information, or information as to circumstances where the image information was created, for example, which additional information is attached to the image information, may be separated from the image information. Such additional information does not accompany the image information when the image information is output, by LAN, FAX, or when image information is printed by the printer.

(2) The image information is received as a corresponding image, but the meaning that the image originally has is not retrieved. Thus, processes such as an sorting of the image cannot be executed automatically. An operator has to determine the meaning of the image by inspecting the image on the screen so as to sorting it. In such a system, processes related to image information cannot be executed efficiently, and further, a problem such as of a double registration of the image information, may occur as a result of a difference in determinations among the operators.

(3) The above-mentioned problem occurring as a result of a device difference may occur. Such a problem interferes with wide usage of the image information.

(4) In a case where second image information results from modifying the first image information, the second image information is treated independently from the first image information. Thus, the origin of the second image information may become unclear. Further, a copyright problem may occur.

(5) There are two kinds of information. The first kind of information may be opened to the general public, while the disclosure of the second kind of information must be controlled. Such an control over the second kind of information has been executed in the application software for the information. In this case, however, the problems described in the above (3) and (4) may occur. As to (3), this is because of a difference in the application software caused by a difference in the device that process the information. Further, as to (4), the disclosure of the second image information, being treated independently from the first image information cannot be controlled while the disclosure of the first image information is being controlled, even if the disclosure of the second image information also has to be controlled.

(6) There have been the following problems regarding the conventional registration/sorting systems. It is difficult to express various attributes by means of numerals, as these attributes correspond to particular human being's subjective opinions. The sorting and retrieval information using such numerals accordingly has not been easy to use. Further, another kinds of sorting and retrieval information may not be recognized intuitively be the operator, which sorting and retrieval information is comprising numerals that can be obtained as a result of expressing, for example, continuous values, or values distributed on a plane, with discrete numerals, which expressing includes some jumping of logic between the discrete numerals and the continuous values or the values distributed on a plane.

(7) In the case where the above-mentioned marker is attached to the image information during use of the electronic filing apparatus, another problem may occur. In this case, the image information corresponding to be a document marker attached thereto, the marker signaling that the document has a time limit such that, for example, the document requires an action be taken by a certain date, for example is the document has to be used for a meeting to be held at a certain date. A countermeasure needs to be taken for ensuring that the operator becomes aware that a time dead line is approaching. Such a countermeasure may be instituted by requiring a certain management action to be taken in addition to the daily routine. However, such an additional action may interfere with the efficiency of the daily routine of the electronic filing apparatus's operation.

SUMMARY OF THE INVENTION

An object of the present invention is to enable such an electronic filing apparatus to not only store the image information but also to code data made by, for example, word processors, the storing and the utilizing the stored information thus being greatly facilitated. For example, a sorting and a retrieval of input information or produced information is facilitated, the sorting and the retrieval being further enabled executed automatically. Further, respective origins from which respective collections of information originated or respective histories of the ways in which the respective collections of information have been edited are to be clearly obtained. Further, a control of document disclosure (imposing a bill for the disclosure or inhibiting the disclosure) is to be ensured. Further, the above-mentioned problem regarding system incompatibility is to be solved.

Another object of the present invention is improve an easiness of operation of an electronic filing apparatus and an efficiency of retrieval of information stored in the electronic filing apparatus, the improvement resulting from replacement of attributes that are difficult to express by means of numerals, or from replacement of vague attributes such as subjective opinions, by geometrical statements such as positions in a reference plane, or area in the reference plane, or as a result of attributes such as that originally distributed on (expanded on) a reference plane being to be able to be directly retrieved.

Another object of the present invention is to easily and reliably execute a management of time limits associated with information that is stored in an electronic filing apparatus.

Following is a general description of an electronic filing apparatus according to the present invention.

To achieve these above objects, the present invention provides an information file producing system and an electronic filing apparatus for producing an appropriate file of information and for utilizing the produced file of information.

It is a basis of the information file producing system employed by the electronic filing apparatus according to the present invention that: collections of main information are input or produced through peripheral devices such as a scanner, respective additional information packets being attached to the respective collections of main information; the collection of main information and the attached corresponding additional information packet constitute a file of information; and each of the additional information packets is usable for sorting and/or retrieval of the corresponding collections of main information.

Information constituting the additional information packet may include or may be made as a result of combining: a date and a time when the corresponding collections of main information have been made; an application by which the collection of the main information was edited; and sensory impressions sensed by human being such as temperature, humidity, a thickness, a color, a number of stains on the document or how dirty the document is from which document the collections of main information is made or other such arbitrary judgments.

An additional information packet may include: information for controlling output of the corresponding collection of main information; information for sorting the corresponding collection of main information; information indicating a manner in which the corresponding collection of main information has been modified; information for controlling modifications to be performed on the corresponding collection of main information; information for directing an application software employed when the corresponding collection of main information has been processed; and other information.

The collection of main information of the file of information produced in the above-mentioned electronic filing apparatus may be coded, information for decoding the coded collection of main information thus being included in the corresponding additional information packet.

A second file of information may be produced as a result of second additional information packet being attached to the second collection of main information, the second collection of main information being made as a result of extracting a part of the first file of information, produced in the electronic filing apparatus, the second additional information packet corresponding to the second collection of main information.

A fifth file of information may be produced as a result of using a third file of information having a third collection of main information and a third additional information packet and the fourth file of information having a fourth collection of main information and a fourth additional information packet. A fifth collection of main information may be produced as a result of combining a part of the third collection of main information and the fourth collection of main information and editing them. Simultaneously, the third additional information packet is combined with the fourth additional information packet, the fifth additional information packet thus being produced. Thus, the fifth file of information having the fifth collection of main information and the fifth additional information packet is produced.

Further, a seventh file of information may be produced as a result of producing a seventh collection of main information comprising a part of a sixth collection of main information of a sixth file of information, where the seventh additional information packet is produced to be included in the seventh file of information, and the seventh collection of main information is eliminated, the seventh additional information packet having information by which the eliminated seventh collection of main information can be automatically reconstructed as desired.

The electronic filing apparatus according to the present invention comprises:
information file producing means for producing a file of information having a collection of main information and an additional information packet; and
storing means for storing together the collection of main information and the additional information packet of the file of information produced by the information file producing means. Preferably, the electronic filing apparatus preferably further comprises sorting means for automatically sorting the file of information according to the corresponding additional information packet.

Preferably, the electronic filing apparatus further comprises:
transmission means for transmitting the file of information so as to output it; and
apparatus-information adding means for attaching to the additional information packet apparatus information (source information) indicating apparatus characteristics when the file of information is output, which apparatus information is particular information regarding the apparatus that has processed the file of information.

The electronic filing apparatus may comprise additional-information packet controlling means for controlling a sequence of elements constituting the additional information packet and for controlling an increase and a decrease in a number of the elements thereof.

In this case of employing the additional-information packet controlling means, the electronic filing apparatus may preferably further comprise additional-information packet controlling-information attaching means. When the file of information is to be output from the electronic filing apparatus, the additional-information packet controlling-information attaching means attaches the additional-information packet controlling-information to the file of information to be output, the additional-information packet controlling-information indicating a manner in which the additional-information packet controlling means is to control the additional information packet as mentioned above.

Further, the electronic filing apparatus may comprise additional-information packet conversion means. In a case where the file of information having the additional-information packet controlling-information, which file of information is transmitted from a first electronic filing apparatus, is received by a second electronic filing apparatus, the additional-information packet conversion means analyses the additional-information packet controlling-information, and the additional-information packet conversion means thus converts the additional information packet corresponding to the received file of information into another additional information packet which adapts the second electronic filing apparatus that has received the corresponding file of information, when the second electronic filing apparatus is different from the first electronic filing apparatus in the applications thereof, so that the second electronic filing apparatus is able to process the file of information.

Further, the electronic filing apparatus may comprise separating means for separating a plurality of files of information into the respective additional information packets and the respective collections of main information, where the respective additional information packets and the respective collections of main information are related to each other by means of respective identification codes. The electronic filing apparatus may further comprise sorting means for sorting these separated additional information packets.

Further, the electronic filing apparatus may comprise means for attaching, to the additional information packet, information including a part of the information of the collection of main information, or information including information obtained as a result of simplifying the corresponding collection of main information.

Further, the electronic filing apparatus may comprise means for reconstructing or for retrieving the desired collection of main information, based on information obtained from the separated additional information packets corresponding to the respective files of the plurality of files of information. The electronic filing apparatus may comprise means for producing another, new, collection of main information as a result of combining the additional information packets corresponding to respective files of the plurality of files of information.

The electronic filing apparatus may comprise additional-information packet managing means for executing a sorting of elements constituting the additional information packets, or for executing a linking of elements respectively having common attributes, from among the elements constituting a plurality of the additional information packets. The additional-information packet managing means may further separate the respective additional information packets into elements, the additional-information packet managing means then collecting the elements having common attribute. The additional-information packet managing means may further attach respective identification codes to respective additional information packets for the respective collections of main information. The identification codes are used for reconstructing the original additional information packets from the separated corresponding elements as a result of joining the separated corresponding elements according to the corresponding identification code.

The electrical filing means may comprise reference-information producing means and additional-information packet reconstructing-means. The reference-information producing means produces specified reference information as a result of an operator's specification for reconstructing the desired additional information packets. The specified reference information has elements corresponding to the above-mentioned common attributes. The additional-information packet reconstructing-means retrieves desired elements from the elements that have been collected according to the respective common attributes, the retrieval being according to the respective specified elements of the specified reference information. The additional-information packet reconstructing-means then groups elements from among the elements obtained as a result of the above retrieval, the grouping being according to the identification codes attached thereto, thus the additional-information packet reconstructing-means reconstructs the additional information packets.

The electronic filing apparatus may comprise ranking means. In the case where the additional-information packet reconstructing-means reconstructs the additional information packets, the ranking means ranks the reconstructed additional information packets according to degrees of simplicity of elements having respective common attributes between the specified elements of the specified reference information and the elements of the additional information packets. The degree of the simplicity is determined as a result of counting how many elements of the additional information packet are identical with the elements of the reference information respectively.

Further, the electronic filing apparatus may comprise means for storing reconstructed additional information packets which are frequently referred to, the above means deleting other reconstructed information packets which have not been referred to for a predetermined period of time.

Further, the electronic filing apparatus may employ:

image information reading means for reading image information;

image storing means for storing the read image, together with other information for retrieving the image information, after registration of the read image information;

image indicating (displaying on the screen) means for indicating the read image; and position specifying means for specifying positions on the screen of the image indicating means. The electronic filing apparatus employing the above all means further employs an information file producing means. When image information read through the image reading means is to be registered, a reference coordinate plane, from among a of plurality of reference coordinate planes, these reference coordinate planes being utilized as reference information according to which information the read-image information is registered and the stored image information is retrieved, is displayed on the screen. The operator then specifies a position in the displayed reference coordinate plane, the information file producing means then produces a file of information having the corresponding collection of main information and the corresponding additional information packet. The corresponding collection of main information is the read image information and the corresponding additional information packet comprises information indicating the coordinates of the position that the operator has specified and identification information (ID information) corresponding to the displayed reference coordinate plane.

An electronic filing apparatus, such as above which employs the reference coordinate planes, may employ first searching means. In a case where the desired collection of main information is retrieved according to the additional information packets corresponding to files of information registered in the image storing means, the corresponding plane from among the reference coordinate planes is displayed on the screen in accordance with a specification by the operator. Then the operator specifies a desired position on the displayed reference coordinate plane. Then the first searching means searches for the first collections of main information, the collections of which first collections of main information each have respective additional information packets that have respective information indicating respective first coordinates on the displayed reference coordinate plane, which first coordinates have distances respectively, which distances are within a predetermined distance from reference coordinates respectively, which reference coordinates correspond to the position where the operator has specified.

The electronic filing apparatus may further employ a second searching means. The second searching means searches for the second collections of main information from among the above-mentioned first collections of main information as a result of sorting the first collections of main information according to the respective distances between the reference coordinates corresponding to the position specified by the operator and the respective first coordinates corresponding to the first collections of the main information, which first coordinates are within a predetermined distance from the reference coordinates of the position specified by the operator. Here, it may be determined that the shorter the distance, the more important that the information is, which corresponds to the second collection of main information, retrieved as a result of a search by means of the second searching means. That is, the shorter the distance between the position specified by the operator in the reference coordinate plane and the coordinates corresponding to the second collection of the main information, the closer the relationship between the contents that the operator has intended to retrieve and the contents of the second collection of the main information.

An electronic filing apparatus, such as described, employing the reference coordinate planes, may employ a third searching means. In a case where the desired collection of main information is to be retrieved according to the additional information packets corresponding to files of information registered in the image storing means, the corresponding plane of the reference coordinate planes is displayed on the screen in accordance with a specification by the operator. Then, the operator specifies a desired area on the displayed reference coordinate plane. The third searching means then searches for third collections of main information, respective collections of which third collections of main information have respective additional information packets that have respective information indicating respective coordinates on the displayed reference coordinate plane, which coordinates are located in the specified desired area on the reference coordinate area, respective coordinates corresponding to the above third collections of main information.

An electronic filing apparatus, such as mentioned above, employing the reference coordinate planes, may employ a fourth searching means. In this case, the respective additional information packets have respective area information indicating respective areas on the corresponding reference planes from among the plurality of the reference coordinate planes. In a case where the desired collections of main information are retrieved according to additional information packets corresponding to files of information registered in the image storing means, the corresponding reference plane of the reference coordinate planes is displayed on the screen in accordance with a specification by the operator. The operator then specifies a desired area on the displayed reference coordinate plane. Then the fourth searching means searches for the fourth collections of main information, respective collections of which have respective additional information packets having respective information indicating respective areas on the displayed reference coordinate plane, which areas, at least partially, overlap with the are specified on the reference coordinate plane, and which areas correspond to the fourth collections of main information respectively.

The electronic filing apparatus may comprise means for producing the file of information having the collection of main information input or produced through the peripheral devices such as scanner, and the additional information packet including information indicating the time limit by which a certain action corresponding to the respective collection of main information has to be taken, and it may comprise also other means for registering the produced file of information.

In the case where the additional information packet including the time limit information is employed, the electronic filing apparatus may further comprise time-limit detecting means. When power is on in the electronic filing apparatus, or when the operator executes the retrieving, or the registering, or other such operations, the time-limit detecting means compares the current date/time with the above-mentioned time limit information of the additional information packet, thus the time-limit detecting means determines whether or not the current time limit is near expiring. The electronic filing apparatus may further comprise an alarm means for displaying a part of a corresponding collection of main information of the file of information together with the corresponding time limit information, when the time-limit detecting means has determined that the current date/time is approaching the corresponding time limit.

The electronic filing apparatus may employ marker attaching means for attaching a time limit specifying marker to the corresponding collection of main information of the file of information, the time limit specifying marker specifying the time limit associated therewith. In the case where the time limit specifying marker is used, the electronic filing apparatus may employ alarm means for displaying the time limit specifying marker when the operator operates the electronic filing apparatus so as to cause the screen to display the corresponding collection of main information.

Following is a general description of functions performed by the electronic filing apparatus according to the present invention.

In the above-mentioned configuration of the information file producing system and the electronic filing apparatus according to the present invention, the produced file of information includes the case of a collection of main information such as the image information and the additional information packet effective for the sorting and/or retrieval of the corresponding collection of main information. Thus, when the produced file of information is utilized as a result of a main processes such as modification of and/or sorting of and/or retrieval of the corresponding collection of main information, a preliminary process or a provisional process for the main processes is performed by using only the additional information packet first without using the corresponding collection of main information, the corresponding collection of main information may be read, finally, as necessary, after almost all of the processes of the main processes have been completed by the preliminary/provisional processes using only the additional information packet.

In accordance with the present invention, the collection of main information and the corresponding additional information packet of the file of information are associated and they are not used separately unless the collection of main information is eliminated.

Further, in accordance with the present invention, an improved MMI (man/machine interface) is achieved for the retrieval operation, because input sensory impressions included in the additional information packet are stored when the corresponding collection of main information is stored, the sensory impressions (based on sense of the human being) being those input by an operator human being. The additional information packet according to the present invention may further, include various other information (data) so as to provide various functions to the additional information packet. The various functions may be such that: disclosure of the corresponding collection of main information may be controlled appropriately, the origin or the editing history of the corresponding collection of main information may be recognized by having stored it, or a problem occurring as a result of a system incompatibility may be solved.

Further, the additional information packet according to the present invention may include an active information that controls manners in which processes such as modification are performed on the corresponding file of information. Thus, the file of information itself may automatically start necessary programs so that the programs started by the file of information process the file of information, automatically collecting necessary information for conducting the process, and further automatically requesting the operator to input necessary information. Therefore, management and processing of the file of information may be greatly facilitate.

Further, in accordance with the present invention, when the image information acting as the collection of main information read through the image information reading means is registered, the desired reference coordinate plane is then displayed on the screen, and the operator then may specify a desired position or a desired area on the reference coordinate plane. Thus, the coordinate information corresponding to the specified position or area and the identification (ID) information corresponding to the displayed reference coordinate plane are included in the corresponding additional information packet. The additional information packet including such coordinate information facilitates the retrieval of the file of information.

That is, various operations in the electronic filing apparatus employing the present invention become easier and the retrieval of the files of information stored in the electronic filing apparatus becomes more efficient, as a result of replacing attributes that are difficult to express with numerals, or of replacing vague attributes, such as subjective opinions, with geometrical statements such as positions in a reference plane, or area in a reference plane, or as a result of attributes originally distributed (expanded on) on a reference plane being to be able to be directly retrieved.

In examples of the method employing the reference coordinate planes, the following information may be utilized for the sorting and/or retrieval: attributes corresponding to values indicated on a graph, that is non-quantitative information that can be indicated on a plane, information corresponding to positions located on a map, information corresponding to diagram positions showing a construction, and other similar information.

Further, when using the additional information packet, according to the present invention, including the time limit information, management of time limits for the corresponding files of information may be executed reliably and easily.

Other, objects and further features of the present invention will become more apparent from the following detailed description when read in conjunction with the accompanying drawings.

BRIEF DESCRIPTION OF THE DRAWINGS

FIGS. 10A and 10B show an illustration for the extracting process; an illustration of a first additional information packet of the first file of information and from which information is extracted and an illustration of a second additional information packet of the second file of information which is obtained using the extracted information;

FIG. 13 shows an illustration of contents of "3: DEGREE OF IMPORTANCE" included in the additional information packet shown in FIGS. 10A and 10B;

FIG. 14 shows an illustration of contents of "4: OUTPUT RANK CONTROL" included in the additional information packet shown in FIGS. 10A and 10B;

FIG. 15 shows an illustration of contents of "5: RETRIEVAL INFORMATION" included in the additional information packet shown in FIGS. 10A and 10B;

FIG. 16 shows an illustration of contents of "6: DATE" included in the additional information packet shown in FIGS. 10A and 10B;

FIG. 17 shows an illustration of contents of "7: APPLICATION" included in the additional information packet shown in FIGS. 10A and 10B;

FIG. 18 shows an illustration of contents of "7: LOW LEVEL INFORMATION" included in the additional information packet shown in FIGS. 10A and 10B;

FIG. 22 shows a reference information to be used for retrieval of a desired file of information in the electronic filing apparatus;

FIG. 35 shows an essential operation flow in which the electronic filing apparatus shown in FIG. 33 is started.

DESCRIPTION OF THE PREFERRED EMBODIMENTS

Figure 2:
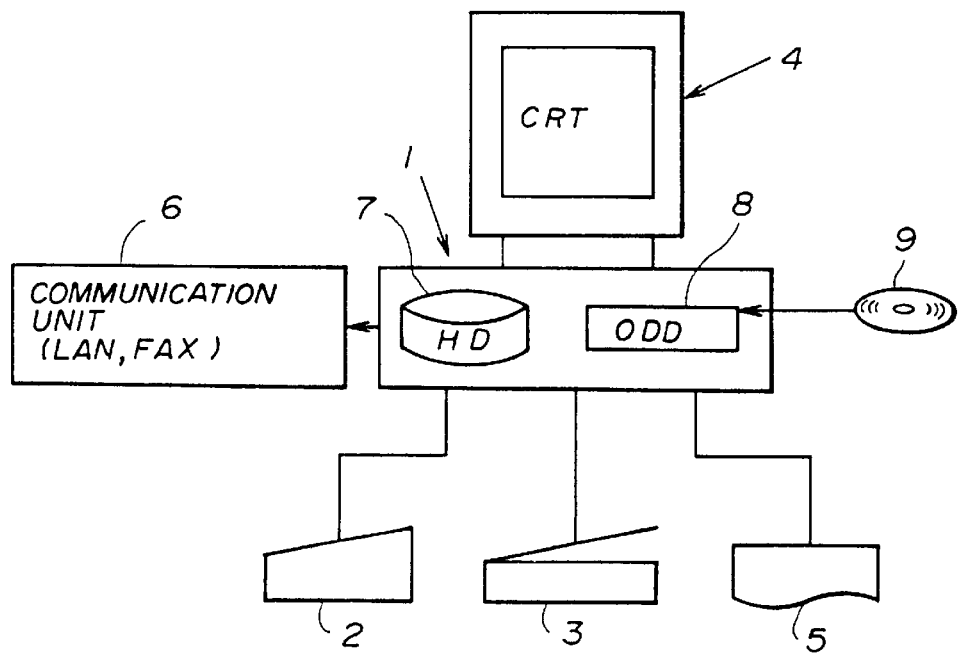
FIG. 2 shows a system configuration of an electronic filing apparatus by which the present invention may be employed.
Figure 3:
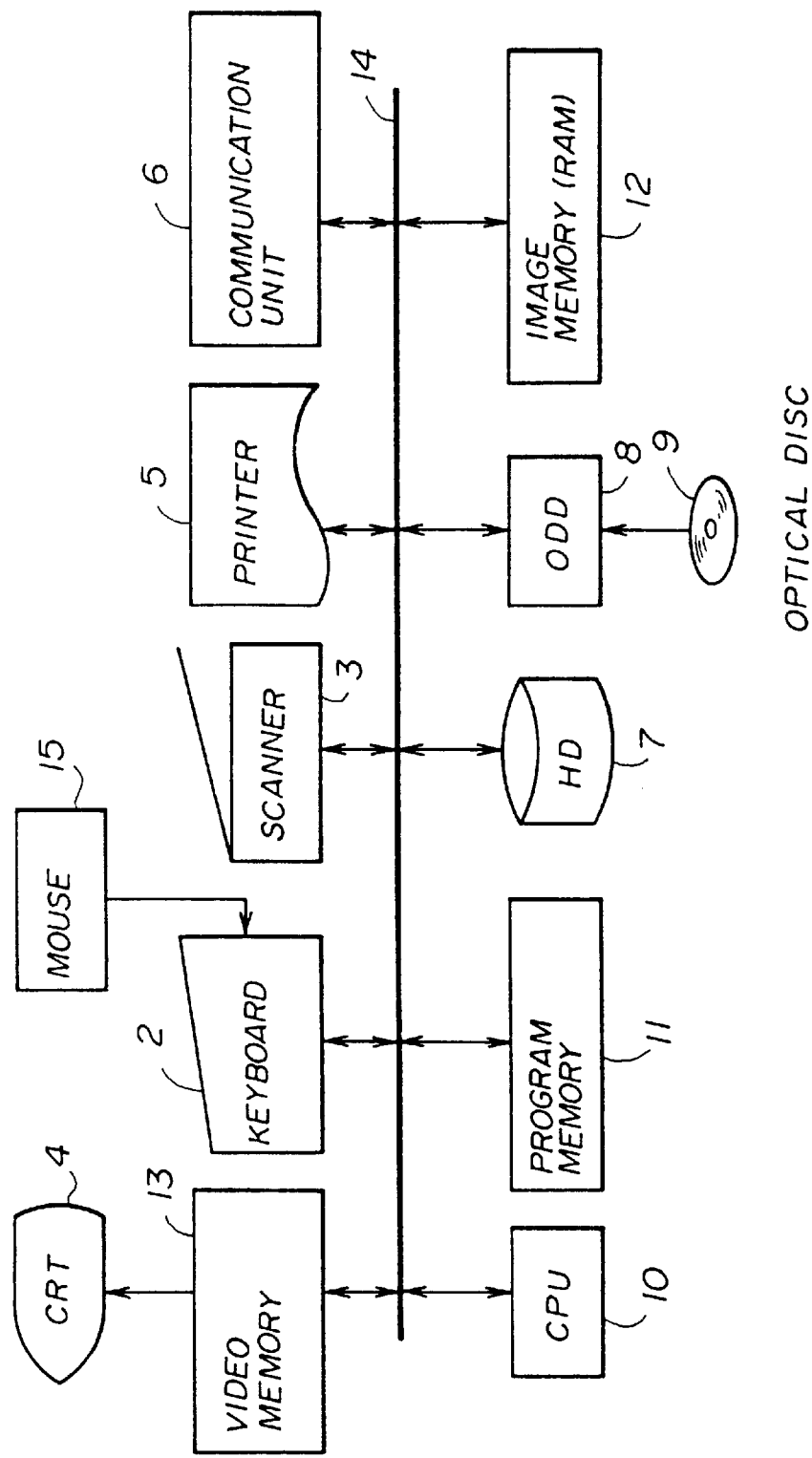
FIG. 3 shows a block diagram of the electronic filing apparatus.

An electronic filing apparatus by which the present invention is employed has a hardware configuration similar to that shown in FIGS. 2 and 3. Thus, FIGS. 2 and 3 will be used for the description of the embodiments of the present invention.

A configuration of an information file produced by an information file producing system according to the present invention will now be described with reference to FIG. 1.

The Microsoft Company has proposed a TIFF format that is a format of a file of information relating to the present invention.

The TIFF format defines a configuration of a file of image information, wherein a tag is attached to the image information, the tag indicating information such as approximate physical level information such as, for example, a kind of a related scanner, or a resolution of a related apparatus. This tag does not include information indicating contents of the corresponding image information and does not include active information for controlling a manner in which the corresponding image information is to be edited, output, or retrieved.

Figure 1:
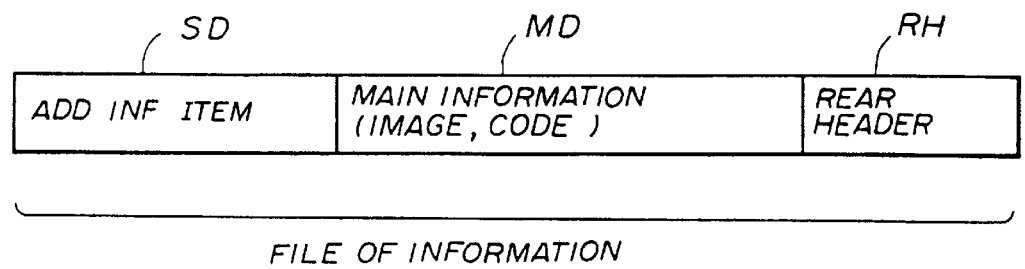
FIG. 1 shows a configuration of an example of a file of information produced by a information file processing system according to the present invention.

A file of information produced in accordance with the present invention has, as shown in FIG. 1, a collection of main information MD, an additional information packet SD, and a rear header RH. The rear header RH indicating later processing information such as information for error detection and/or reproducing. Such a rear header RH will be considered as included in the collection of main information MD because a technology for the rear header RH is well known.

In the electronic filing apparatus according to the present invention, the collection of main information MD and the additional information packet SD, wherein the collection of main information MD is made as a result of image information being input or produced through a peripheral device such as a scanner, or wherein the collection of main information MD comprises code information (2 bite information). Further, the additional information packets SD include information effective for sorting and/or retrieval of the corresponding collections of main information.

An additional information packet may include: information indicating a configuration of the corresponding collection of main information; and further may include any information regarding the corresponding collection of main information MD which information is for use for the sorting and/or retrieval of the corresponding collection of main information MD. Further, information not used for the sorting and/or retrieval of the corresponding collection of main information MD, which information has a strong relationship with the collection of main information MD, may be also joined with the collection of main information MD.

An additional information packet SD may include: date/time when the corresponding collection of main information MD has been produced; identifying information of editing applications through which the corresponding collection of main information MD has been edited; sensory data corresponding to a human being's sensory impressions such as concerning ambient temperature, humidity, brightness of circumstances under which the human being has produced the corresponding collection of main information, a color or a thickness of the document from which the corresponding collection of main information has been produced; and any other information.

It is thus possible to execute sorting of the corresponding collection of main information automatically without an operation to be performed by a human being; this is possible as a result of the file of information having implemented therein the collection of main information and the additional information packet for the sorting and/or retrieval as per the present invention.

Information that the additional information packet may include will now be further detailed.

In the case where the date information is employed is an additional information packet, the date relates to the corresponding collection of main information, the date being necessary for retrieval of the corresponding collection of main information. It is possible to retrieve the corresponding collection of main information directly using the date indicated by the additional information packet. Alternatively, it may be possible, for example, to utilize contents in a schedule, such as a meeting to be held at a certain date, in a manner similar to the date information. That is, when a name of the meeting is described in the additional information packet, but a the corresponding date for holding the meeting is not described, the electronic filing apparatus may retrieve the corresponding collection of main information indirectly, by assuming the meeting holding date. This assumption of the meeting holding date is executed by referring a date schedule of various meetings and similar events, which date schedule has been previously stored in a database of the electronic filing apparatus, and which date schedule including the corresponding meeting holding date.

In the case where the additional information packet employs the editing application (identifying) information, the corresponding desired collection of main information may be retrieved, using the application name (or other identifying information) through which application the collection of main information has been produced. Further, the application name described in the corresponding additional information packet may be used for displaying the corresponding collection of the main information or for modifying the collection of the main information by using the application. Therefore, management and processing of the collections of main information can be greatly facilitated.

In the case where sensory impressions employed, a smooth man/machine interface in the information retrieval can be achieved in contrast to previous technology.

Further, the additional information packet SD may employ other information such as: information for controlling output of either a part of or all of the corresponding collection of main information, or information indicating an application name corresponding to a retrieval application (an application used for retrieval of a file of information), or indicating a manner in which the retrieving has been performed: or other information such as source (origin) information, for example, indicating an ID number of an apparatus which has produced the corresponding collection of main information.

In the case where a file of information is newly produced, the following data is produced as the additional information packet: the production date, the application software name used for the production, the data corresponding to human being's sensory impressions which have been automatically sensed by appropriate devices (for example, a temperature is automatically sensed by a temperature detector), the name or ID number of the apparatus that has produced the corresponding collection of main information, low level information such as information indicating a configuration of the corresponding file, and other information. Further, other information such as for output control information may be produced as the additional information packet. Examples of this output control information are: information specifying a type of a printer to be used for outputting the corresponding collection of main information, information of a rank for the corresponding collection of main information, which information of a rank is determined by the operator according to a degree of an importance of the corresponding collection of main information.

The output control information will now be detailed. In the case where the collection of main information is the image information, when the operator intends that a certain area in the corresponding image is to be secret so as to remain unprinted during the printing process, information necessary for such a process is then written as the additional information packet together with coordinate information indicating the corresponding certain area of the image. An alternative is that the additional information packet specifies that a certain area of the image can be displayed on the screen, but that the certain area cannot be printed.

Further, the additional information packet may include information for controlling an output of the corresponding image information through ranking. That is, a part of the image can be output only for a user who belongs to a particular class (post), such as a director of a company. Such an output control can be made as a result of the additional information packet having information of: the coordinate information corresponding to the part of the image, and corresponding rank information such as information for passwords. Such passwords are controlled according to the rank of the user such that particular passwords can be known by the corresponding user.

Further, in the case where the file of information is received from outside, the file of the information including the corresponding additional information packet, when the transmitting and receiving electronic filing apparatuses have the same processing system (compatible systems) as each other, the receiving electronic filing apparatus thus being able to read the received information file, the received information file is sorted automatically. Further, when the transmitting and receiving electrical apparatuses have processing systems different from each other, because the information file has the corresponding additional information packet including the application information or the additional information packet comprising the application software (program) itself, the receiving electronic filing apparatus is able to run an appropriate converting software so as to convert the received file of information to a state in accordance with the received application information wherein the receiving electronic filing apparatus is able to process the file of information or the application software (program) itself as the corresponding additional information packet thus being able to process the information file. Then, in the case where the same sorting and retrieval application software is used for the transmitting and the receiving electronic filing apparatuses, the received file of information is automatically sorted; and in the case where the transmitting and receiving apparatuses have different sorting and retrieval application software from each other, an additional-information packet controlling-information that has been previously employed by the additional information packet, being thus used for changing a sequence of elements constituting the additional information packet and/or deleting the certain elements and/or modifying the certain elements so that the configuration of the additional information packet becomes to adapt the sorting and retrieval application software of the receiving electronic filing apparatus.

A configuration of an electronic filing apparatus according to a first embodiment of the present invention will now be described. As mentioned above, the configuration thereof is similar to that shown in FIGS. 2 and 3. However, the functions of the electronic filing apparatus according to the first embodiment of the present invention are different from those as described above with reference to FIGS. 2 and 3.

The functions of the electronic filing apparatus according to the present invention will now be described with reference to FIG. 4. The electronic filing apparatus according to the first embodiment of the present invention has a system control unit 20, an additional-information packet control unit 21, an additional-information packet collecting unit 22, an inner additional-information packet producing unit 23, a sensory information detecting unit 24, an additional-information input unit 25, an additional-information editing unit 26, an input control unit 27, an input unit 28, a store control unit 29, and a storing unit 30.

The system control unit 20 as a controller executes functions for generally controlling the entire apparatus by means of a computer comprising the CPU 10, the program memory 11 (both shown in FIG. 3,) and other necessary devices.

The additional-information packet control unit 21 controls additional-information packet editing processes such as: extracting of the additional-information packet when the image information (the collection of main information) is input, and producing another additional information packet through combining the respective additional information packets of the respective files of the plurality of files of information.

The additional-information packet control unit 21 further executes functions of additional-information control means and functions of additional-information conversion means. The functions of the additional-information packet control means are such that: when the input unit 28 inputs a file of information produced in accordance with the present invention, the additional-information packet control unit 21 extracts an additional information packet of the file of information, and then the unit 21 controls a sequence of elements constituting the additional information packet and also controls an increase and a decrease of the elements thereof. The functions of the additional-information packet conversion means are such that: when the additional information of the input file of information has additional-information packet controlling-information (a software for controlling the sequence of the elements of the additional information packet), the additional-information control unit 21 analyses the additional-information packet controlling-information, then converts the corresponding additional information packet into another additional information packet (having a standard format particular to the apparatus) appropriate for this apparatus that has input the corresponding file of information, and then transfers the converted additional information packet to the additional-information editing unit 26. These functions of the additional-information packet control unit 21 facilitate management of various additional information packets.

The additional-information packet collecting unit 22, under control of the additional-information packet control unit 21, collects information input through the inner additional-information packet producing unit 23, the sensory information detecting unit 24, and the additional-information input unit 25, then the additional-information packet collecting unit 22 transfers the additional-information packet to the additional-information editing unit 26 and then to the storing unit 30.

The inner additional-information producing unit 23 has calender and clock functions, a memory storing the apparatus's own ID number (code), a function for determining a resolution of the input image information, and other necessary functions. The inner additional-information producing unit 23 generates information to be included in the additional information packet, such as information regarding the apparatus itself, or information that the apparatus itself can produce. Information that the apparatus itself can produce includes such as: date, month and year, a day of the week, time information (respectively generated as a result of counting of the inner clock,) the ID number of the apparatus itself, the resolution of the image information when the image is input, the application software name (or application software identifying information), and other information.

The sensory information detecting unit 24 has a temperature sensor, a humidity sensor, an optical sensor (illuminance sensor), a color sensor, and other sensors. These respective sensors automatically detect information corresponding to the respective human being's sensory impressions (mainly these impression being regarding those for the circumstances where the corresponding collection of main information has been processed). The sensory information detecting unit 24 detects circumferential temperature, humidity, and brightness, and the paper color of the document from which the scanner has read the corresponding image information, and other similar information so as to include this information in the additional information packet.

The additional-information packet input unit 25 has the keyboard 2, the mouse 15, and other devices, respectively operated by a human being. These devices are used for inputting sensory information, corresponding the human being's sensory impressions, which information is difficult to detect automatically, the sensory information being such as: the thickness of the document from which the corresponding image information is obtained, stains of the document, a feel of the document (i.e. the operator feels when the operator touch the document), and other similar sensory impressions regarding the document. Further, through the additional-information packet input unit 25, other information such as included to the additional information packet may be: information for sorting of the corresponding file of information, a degree of importance of the file of information, the purpose of the file of information, a limitation concerning outputting of the file of information, a limitation concerning disclosure of the file of information (i.e. a charge to be imposed for the disclosure thereof, passwords needed for the disclosure thereof, and other similar information), a limitation concerning deleting of the file of information, a limitation concerning modification of the file of information, the name of user who has made the file of information.

The additional-information packet editing unit 26, under control of the additional-information packet control unit 21, may receive, depending on a case, additional information packets having been separated from the input file of information and having been edited by the additional-information control unit 21. Then, the additional-information packet editing unit 26 edits the additional-information packet as mentioned below. Further, the additional-information editing unit 26 may combine the additional information packets of the plurality of files of information, or the additional-information packet editing unit 26 may separate the additional information packet of a file of information. Further, the additional-information packet editing unit 26 may combine the additional information packet newly produced by the additional-information packet collecting unit 22 and another additional information packet. After editing the additional information packet as mentioned above, the additional-information packet editing unit 26, transfers the resulting packet to the storing unit 30.

The input control unit 27 controls the input of image information (a file of image information) or document information (a file of character code information), the input being executed through the input unit 28.

The input unit 28 comprises devices such as: the scanner 3 employing a CCD line sensor, a video camera, the communication unit 6 such as a FAX, or a LAN, the optical disc driving device (ODD) 8. The input unit 28 inputs desired image information obtained by scanning the document, or obtained by picking up the image through a camera, or the unit 28 inputs information obtained as a result of receiving it through a FAX, a personal computer, a word processor, OCR, or a similar device, or the unit 28 inputs information obtained as a result of reading it from the optical disc (magneto-optical disc) 9 through the internal ODD. Such information to be input may be in the form of an image, a code, or a file of information including the additional information.

The store control unit 29 may control read/write processes for the storing unit 30, or the control unit 29 may control DMA (direct memory access), or the control unit 29 may control storing devices such as FDD, HDD, ODD, and other devices.

The storing unit 30 may comprise: semiconductor memories such as RAM, FDD (floppy disc driving device), or filing memories such as HDD (hard disc driving device), ODD (optical disc driving device). The storing unit 30, under control of the store control unit 29, stores the collection of main information and the additional information packet respectively as a common file of information in any of the storing devices. The collection of main information comprises image information or document information respectively input through the input unit 28, while the additional information packet comprises the additional information packet obtained as a result of forming by the additional-information packet collecting unit 22 or the other additional information packet obtained as a result of editing by the additional-information packet editing unit 26.

Figure 5:
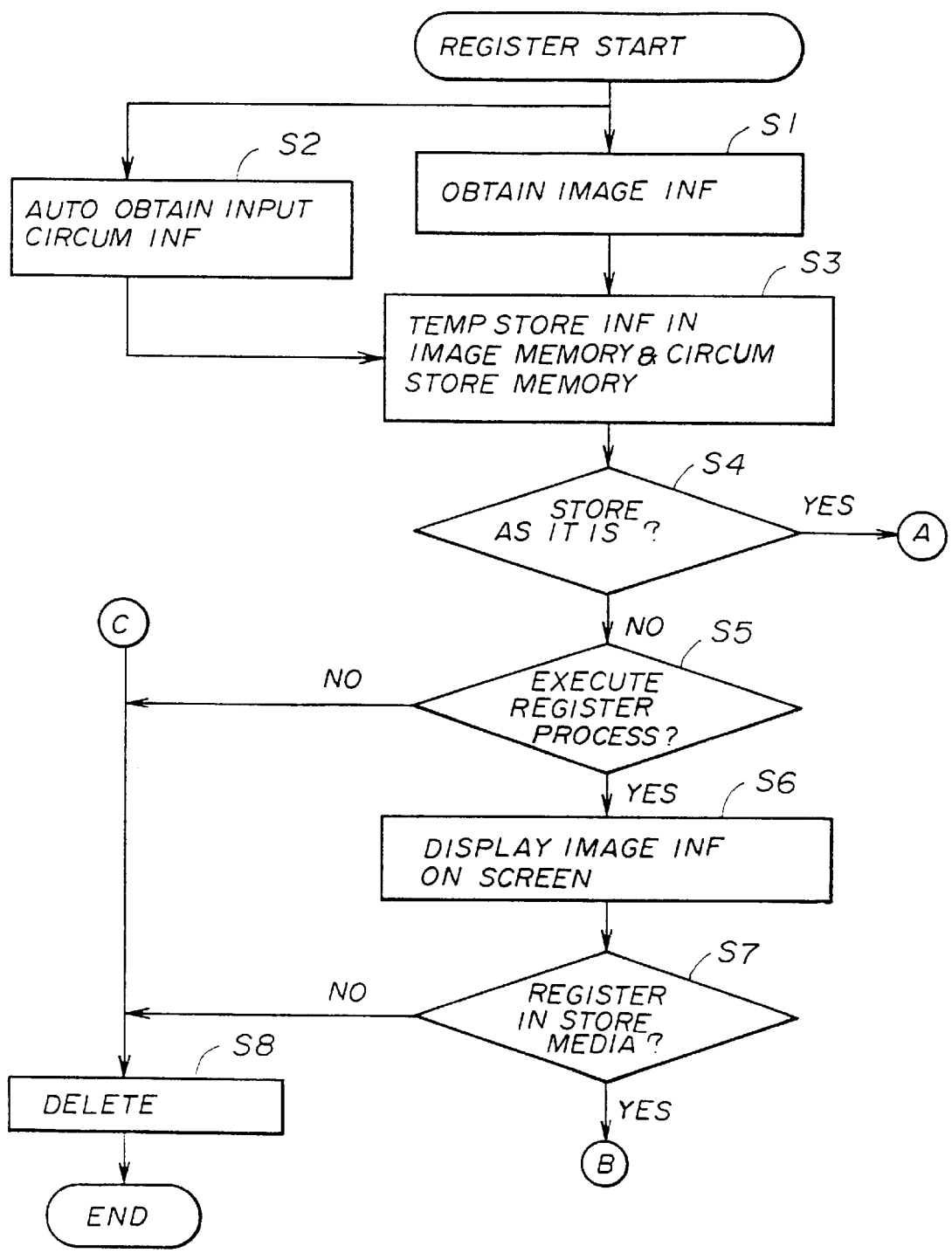
FIGS. 5 and 6 show an operation flow for producing and registering the file of information in the electronic filing apparatus shown in FIG. 4.
Figure 6:
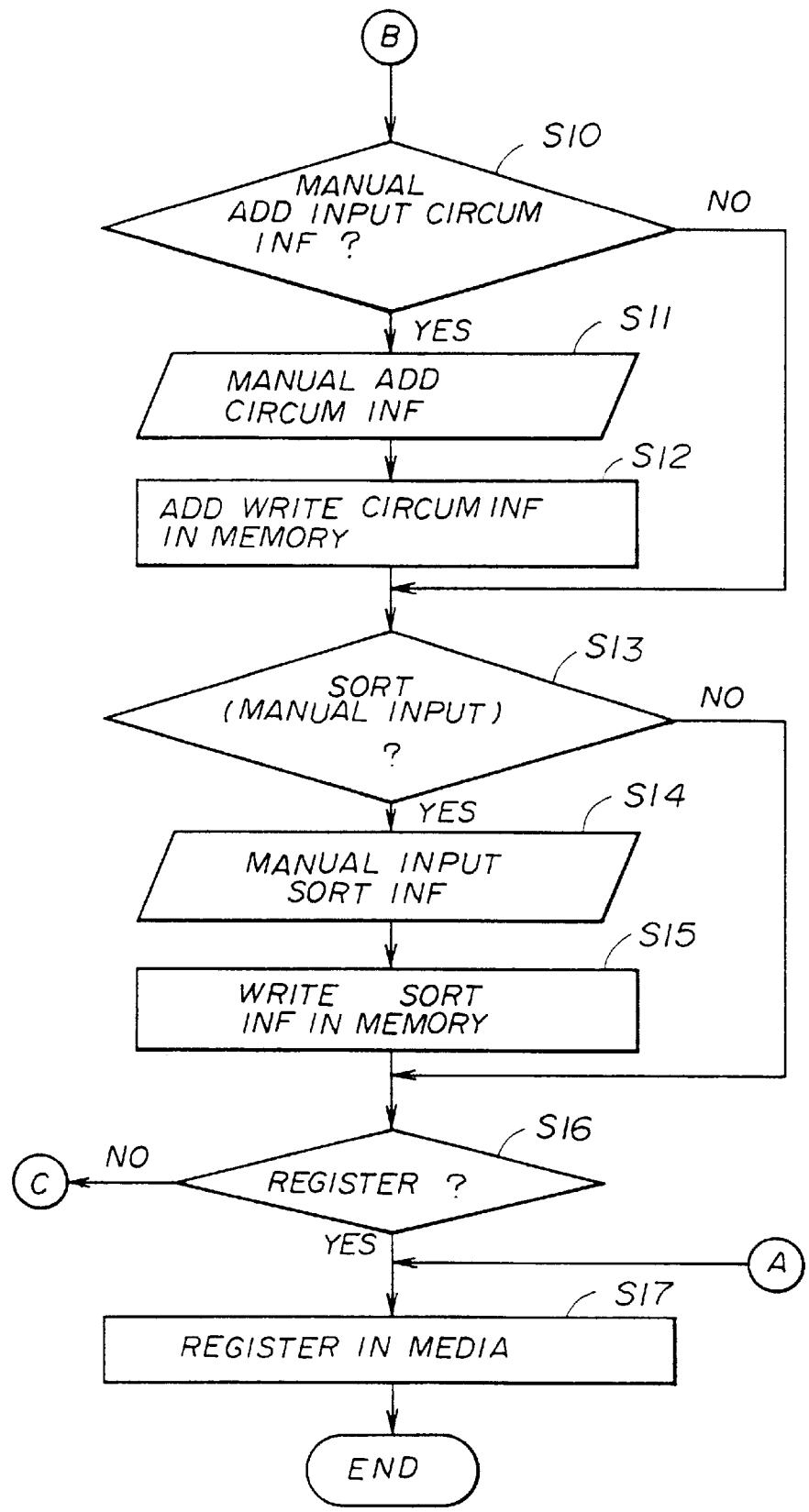

Operation flows for producing the file of information and registering the file of information in the above-mentioned electronic filing apparatus will now be described with reference to FIGS. 5 and 6.

After starting the registering, the image information is obtained through the input unit 28 such as the scanner or the video camera (it may be that the image information, or the code information, or a combination of the image and code information is input through the communication unit) (step S1) (hereinafter, the term "the step" is omitted so that, for example, S1 is used instead of "the step S1"). Simultaneously, circumstantial information (a processing date, a temperature, a humidity, a brightness, and other information) regarding the circumstances under which the corresponding input information is input is automatically obtained through the inner additional-information packet producing unit 23 and the sensory information detecting unit 24 (S2). The image information and the additional information packet are then respectively stored in the image memory and circumstance storing memory (RAM) of the storing unit 30 (S3) temporarily. The image information may be input so that each page of the corresponding document is input one by one intermittently, or a plurality of pages may be input continuously.

Then, the operator inspects the screen of the indicating unit 4 which indicates the corresponding information and the operator specifies, by key operations, whether or not the information corresponding to the displayed information temporarily stored in the storing unit 20 is to be stored as it is. When the operator specifies that the information is to be stored as it is (YES in S4), the file of information, including the collection of main information and the additional information packet, is stored in the media (S17), the current process being then finished. The collection of main information comprised of the image information temporarily stored in the storing unit 30 in S3, while the additional information packet comprised of the circumstance information.

When the operator specifies that the information is not to be stored as it is (No in S4), the operator then has to specify whether or not a registering process is to be executed in S5. When the operator specifies that the registering process is not to be executed (No in S5), the information temporarily stored in S3 is deleted (S8), the current process being then finished. When the operator specifies that the registering is to be executed (Yes in S5), the information temporarily stored in S3 is displayed through the indicating unit (CRT). Then, the operator has to specify whether or not the corresponding information is to be registered in the recording medium (S7). When the operator specifies that the information is not to be registered (No in S7), the information is deleted (S8), the current process being then finished.

When the operator specifies that the information is to be registered, the operator then has to specifies whether or not the circumstance information regarding the circumstance under which the corresponding information has been input is to be added manually. When the operator specifies that the circumstance information is to be added manually (Yes in S10), then the operator additionally inputs, and then causes to be store in the memory, the circumstance information (regarding sensory impressions or place where the original document was obtained, which sensory impressions and place are difficult to detect automatically) (S11 and S12), the input by the operator being executed by using the additional-information packet input unit 25 such as the keyboard 2 (hereinafter, the term "the original document" means the document from which the corresponding information is obtained).

Then, the operator has to specify whether or not the information is to be sorted manually (S13). When the operator specifies that the information being not to be sorted manually (No in S13), then the operator has to specify whether or not the information is to be registered (S16). When the operator specifies that the information is to be sorted manually (Yes in S13), the information is then sorted in accordance with sorting information obtained as a result of the corresponding inputting operation, the corresponding inputting operation being executed by the operator using the additional-information packet input unit 25 (S14), the sorting information being then temporarily stored in the memory (S15).

Then the operator has to specify whether or not the information temporarily stored in the memory is to be registered (S16). When the operator specifies that the information is not to be registered (No in S16), the information temporarily stored in the memory is thus deleted (S8). When the operator specifies that the information is to be registered (Yes in S16), the file of information is then produced and stored in the media (S17), the file of information having both the collection of main information and the additional information packet. The collection of main information comprises the image information, while the additional information packet comprises the circumstance information and the sorting information both temporarily stored in the memory.

Figure 7:
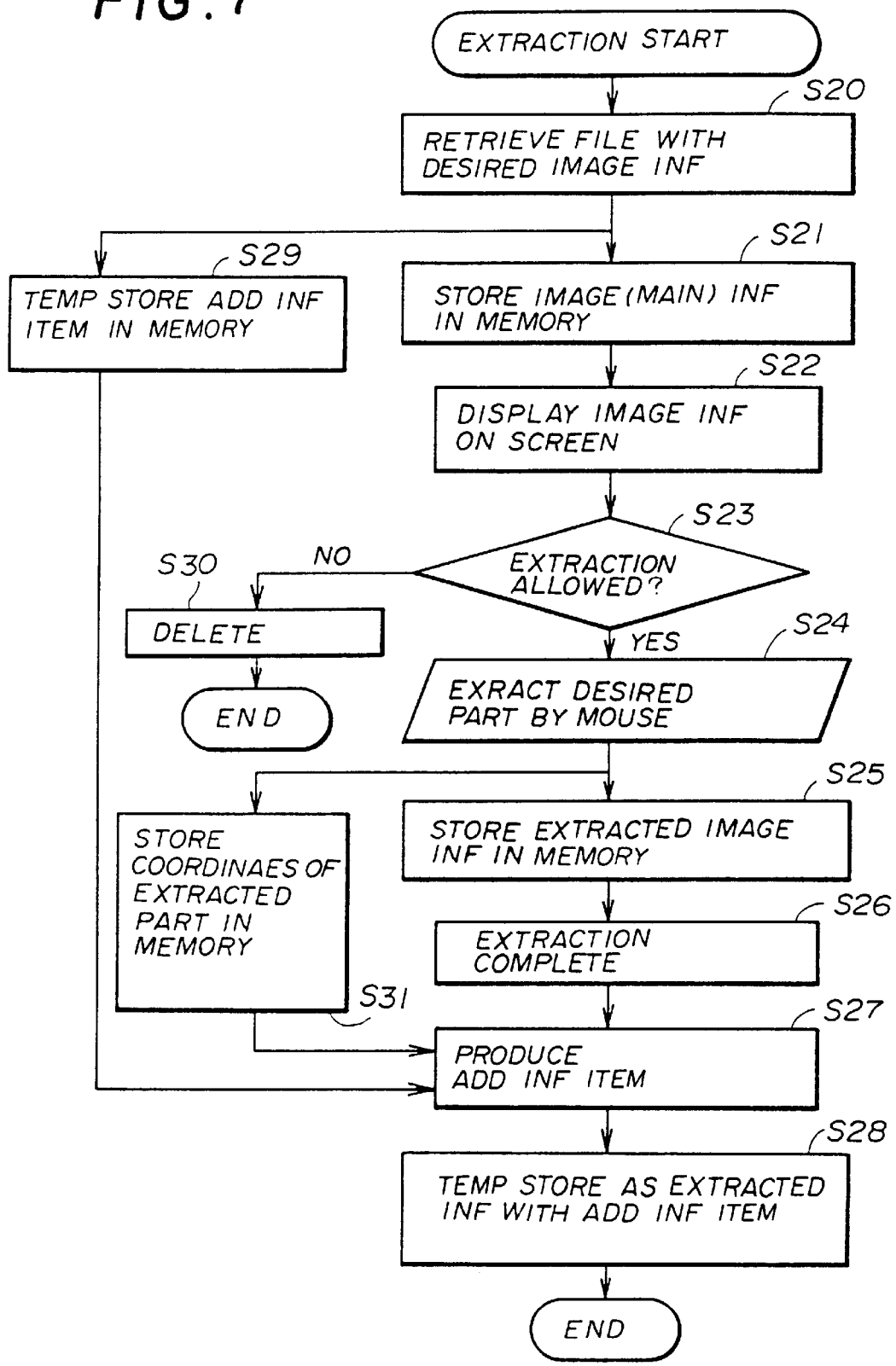
FIG. 7 shows an operation flow for producing a second file of information including extracted information obtained as a result of extracting a part of the first file of information produced by the electronic filing apparatus shown in FIG. 4.
Figure 8:
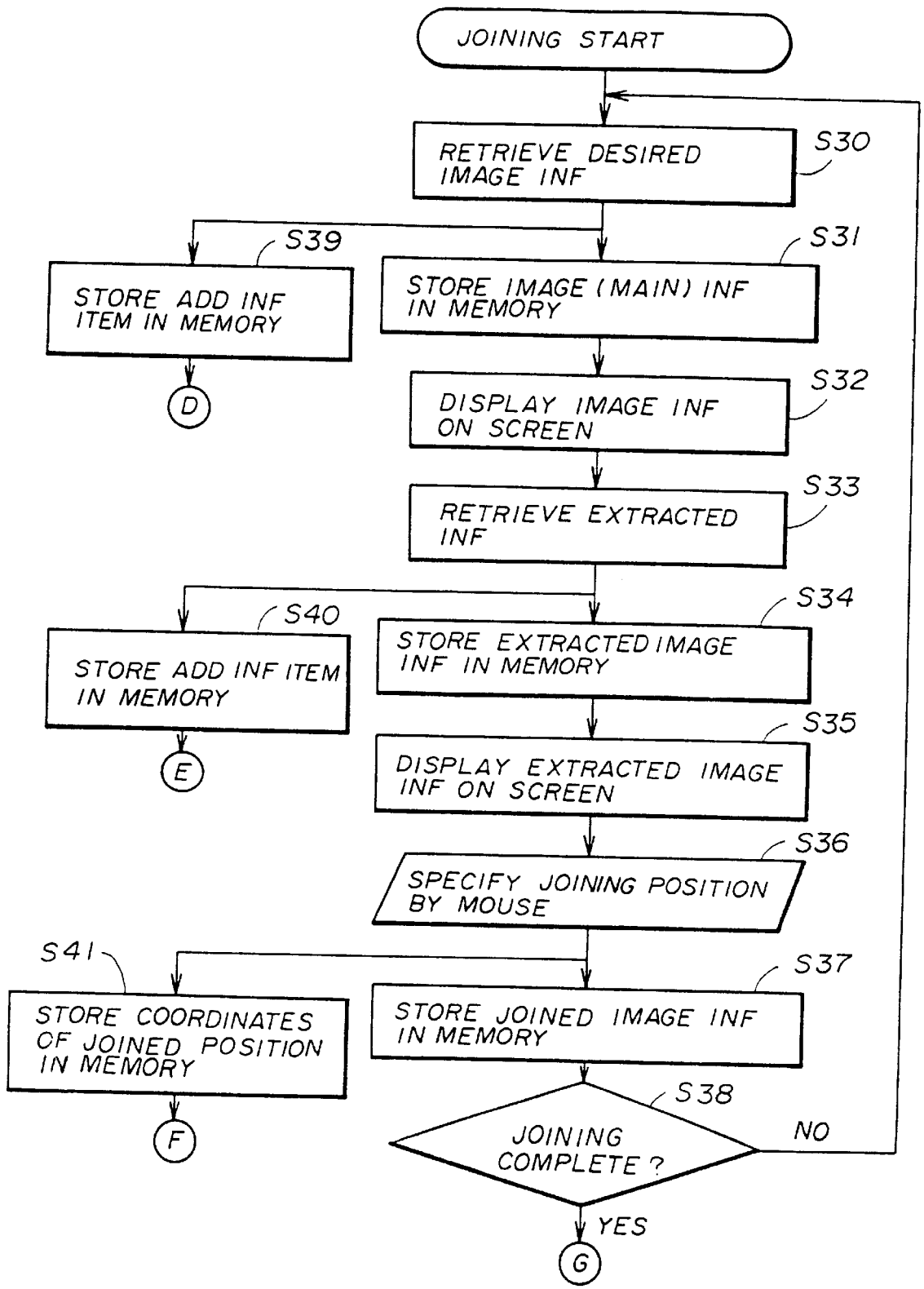
FIGS. 8 and 9 show an operation flow for producing a new fourth file of information as a result of joining information extracted from the second file of information with a third file of information.
Figure 9:
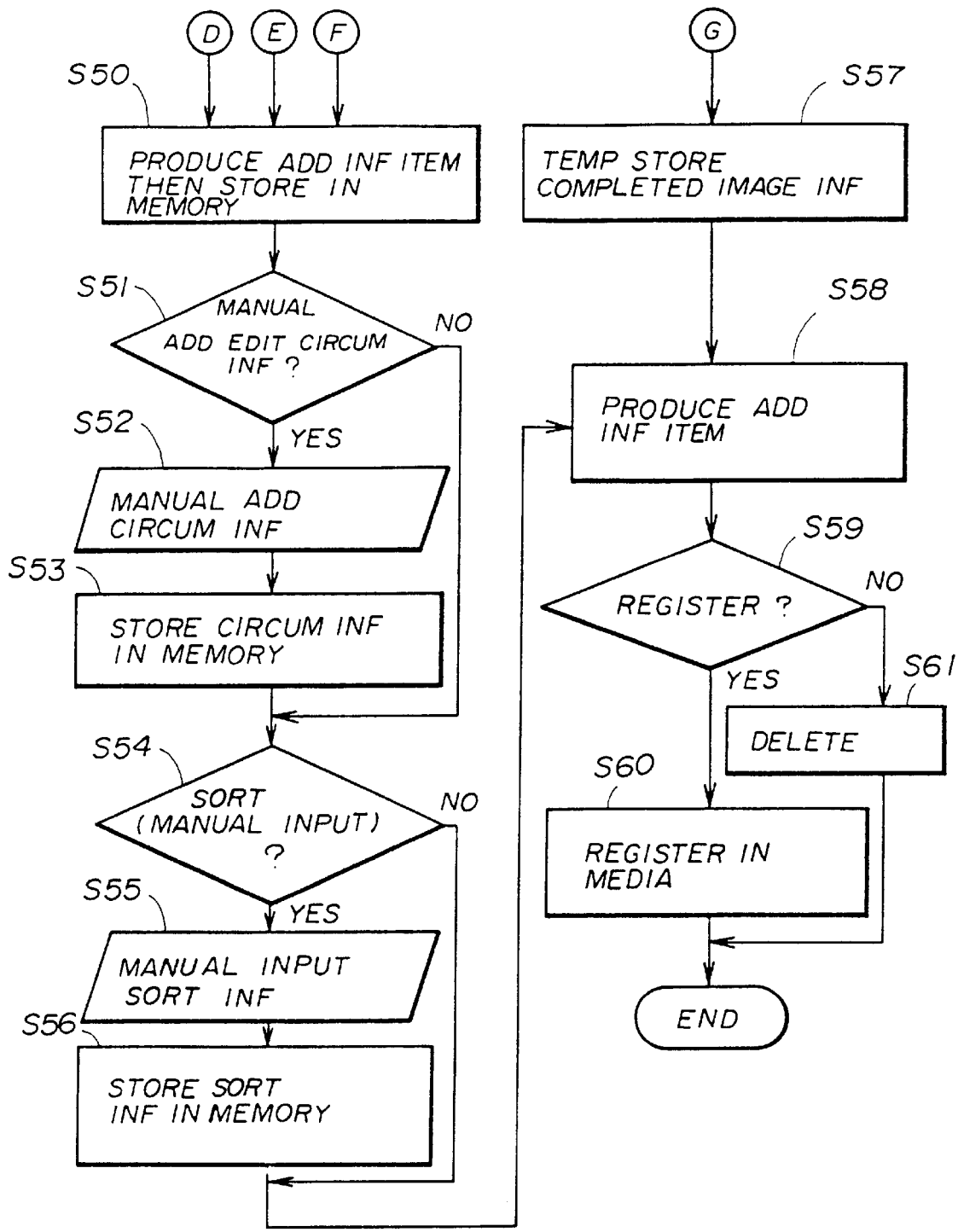

Further, extraction operations will now be described with reference to FIGS. 7 through 9. In the extraction operation, a part of the collection of main information of the file of information produced as the result of the above-mentioned processes is extracted, another file of information being then produced as a result of editing the extracted part.

The extraction process will now be described with reference to FIG. 7. The file of information having the desired image information is retrieved from the external input device (the external HDD or the external ODD) or the internal optical disc driving device (ODD) (S20). The image memory acting as the collection of main information of the retrieved file of information is then stored in the memory (S21), the image memory being then displayed on the screen (S22), the corresponding additional information packet being then temporarily stored in the memory (S29).

Then, it is determined whether or not the extraction of the desired part of the above image information is allowed (S23). That is, it is determined whether or not the part to be extracted has limitations that limit the extraction process. The limitation may depend on, for example, the class (post) of the operator (user). As a result of the determination, when the extraction is not allowed (No in S23), the stored information is thus deleted from the memory (S30). When the extraction is allowed (Yes in S23), the operator then has to specify the position on the retrieved image information of information, it is desired to extract, the specification taking place as a result of the operator specifying by means of a pointing device, such as the mouse 15 (S24). Then, the part to be extracted of the image information is stored in the memory (S25), the current extraction processes being then finished. Information for coordinates corresponding to the positions if the image information are also stored in the memory (S31).

Then, origin information (information such as: an ID of the apparatus that has produced the file of information from which the desired part has been extracted in the above-mentioned extraction processes, editing application for the file of information, low level information such as resolution for the file of information, the position of a part of the file which part has been extracted, date/time attributes) acting as a part of the additional information packet is produced (S27) and the extracted part of the image information, called the extracted information, is stored (S28) temporarily, the current process being then finished. The produced origin information comprises: the additional information packet stored in the memory in S29, the coordinate information stored in S31, and other necessary data if any.

Joining operations will now be described with reference to FIGS. 8 and 9. In the joining operations, the part of the first file of information, which part has been extracted in the extraction processes shown in FIG. 7, is joined to the second file of information, and a new third file of information is thus obtained. Similarly to the processes in the above-mentioned extraction operations, a second file of information having a desired image information is retrieved from the external input device (the external HDD, ODD or the other device) or the internal optical disc driving device (ODD) (S30). Then the image information corresponding to the collection of the main information of the retrieved second file of information is displayed on the screen (S32). Similarly, the additional information packet of the retrieved second file of information is temporarily stored in the memory (S39). In a case where the collection of main information of the new third file of information is made only from the above-mentioned extracted image information, a blank image information (no actual information being included therein) is stored in the memory (S31) and then displayed on the screen (S32). The image corresponding to the above extracted image information is then placed on the blank image corresponding to the above blank image information so as to make the new third file of information in the above case.

Then, the above-mentioned extracted information is retrieved (S33), which extracted information has been temporarily stored in the memory in S28, the extracted image information then being displayed on the screen (S35), the additional information packet previously attached (S28) to the extracted information being then stored in the memory similarly (S40).

Then, the operator specifies a desired position of the image corresponding to the second file of information by using a device such as the mouse 15 (S36), the specified position being a position to which the extracted image information is to be joined. Then, the extracted image information is joined to the specified position, the image information resulting from the joining being thus stored in the memory (S37), and position information indicating the coordinates of the joined position being stored in the memory (S41). Here, when there is a low level information difference between that of the first file of information and that of the second file of information (hereinafter, the term "the low level information" means information for reproducing the corresponding image, excepting information such as the sorting information and the control information) it is necessary to use the appropriate conversion software so as to adapt them to each other, that is, so as to enable the different kinds of information to be compatible with each other.

Then, it is determined, in S38, whether or not the joining processes have been completed. In a case where a plural number of joining processes are needed, the above-mentioned joining processes have to be repeated the appropriate number of times. Then, after the joining processes have been completed, the completed new image information to be included in the third file of information is temporarily stored (S57).

Further, the new additional information packet to be included in the third file of information is produced so as to comprise: the additional information packets of the first and second files of information and the position information indicating the joined coordinates (coordinates of the positions corresponding to image portions joined as mentioned above), respectively having been stored in the memory (S50).

Then, the operator has to specify whether or not information regarding the circumstances under which the file of information has been edited, as mentioned above, is to be added manually (S51). When the operator specifies that the information regarding the above detailed circumstances is to be added (Yes in S51), the operator then adds the information regarding the circumstances by inputting it through by operation of a device such as the keyboard 2 (S52), the information regarding these circumstances then being stored in the memory (S53). Then, it is determined whether or not manual sorting is executed (S54).

When the manual sorting is not determined as to be executed (No in S54), a step S58 for producing the additional information packet is thus executed. When the manual sorting is determined to be executed (Yes in S54), the operator manually inputs the appropriate sorting information through the operation of a device such as the keyboard 2, the input sorting information being then stored in the memory (S57), the step S58 being then executed.

In S58, a new additional information packet to be included in the third file of information is remade (S58) based on: the additional information packets of the first and second files of information and the position information indicating the joined coordinates, the information regarding the circumstances and the sorting information both input manually, the application's name (or the application's identifying information) which application has been used for the above-mentioned editing, other information regarding circumstance which information has been input automatically, and other necessary information if any.

Then, when the operator specifies the registering (Yes in S59), the third file of information, resulting from the joining of the image information formed in S38 and the additional information packet produced in S58, is stored in the predetermined media, the third file of information being then registered (S60), and the current processes thus ending. When the operator specifies the nonregistering (No in S59), that is a specification for canceling, the completed image information and the made additional information are thus deleted from the memory (S61), the current processes being then finished.

As mentioned in the above, when a file of information having a collection of the main information and an additional information packet both produced in accordance with the method of the present invention is modified, only the corresponding additional information remains or is deleted as a result of the modification. The new information indicating the history of the modification is then added to the corresponding additional information packet, the resulting additional information packet being then attached to the new modified collection of main information. Otherwise, in a case where the information indicating the history is not to be included in the corresponding additional information packet, another new additional information packet is then produced, the other new additional information packet being then attached to the modified new collection of main information. This new additional information packet having been produced as a result of using a part or respective parts of the additional information packet or respective packets of the file or respective files of information before the modification has been applied thereto, the part or parts being such as the information excluding the sorting information and the control information.

By the above-mentioned methods, the information comprises information concerning the origin of its own image information, and, if the information has been modified, information indicating the history or the modifications, thus serving to enable easier management of the files of information. Thus, reliability of the files of information can be improved and it is always possible to reconstruct the original information. In the case where the files of information do not have such a history written therein, this information is treated as a new file of information, and dissociation of information (where, the files of information has no clear origin and is consequently treated as a new independent file of information) can be prevented by keeping an appropriate record of responsibility concerning the corresponding new file of information (the record stating, for example, a person responsible for the corresponding new file of information).

There are two methods for executing such a modification of the information, the modification being executed through the appropriate application software. In the first method, a modification is executed by writing in the corresponding additional information packet a necessary information indicating ways in which desired addition, deletion, partial modification, or another modification of a certain page of the document information is to be executed, without modifying the corresponding collection of main information. In the first method, when the corresponding collection of main information is output, printing or displaying thereof is executed in accordance with the modification ways written in the additional information packet. In the second method, the collection of main information itself is directly modified.

Methods by which the file of information is produced as a result of the above-mentioned extraction and joining processes will now be described with reference to FIGS. 10A through 19.

Methods for the extraction processes will now be described with reference to FIGS. 10A and 10B. The first file of information, a part of which will be extracted, has image information (acting as the collection of main information) indicating, as shown in FIG. 10A, an image S1 having a rectangular shape formed by the solid line. The first file of information further has the additional information packet SD1 having elements 0 through 8. An extracted part "C" having another rectangular shape formed by the dashed line is a part to be extracted.

The elements 0 through 8 constituting the additional information packet SD1 correspond to the following information:

1: control software management;
2: origin information;
3: importance degree information:
4: output rank control;
5: retrieval information;
6: date;
7: application; and
8: low level information (resolution, contrast and other data).

Figure 11:
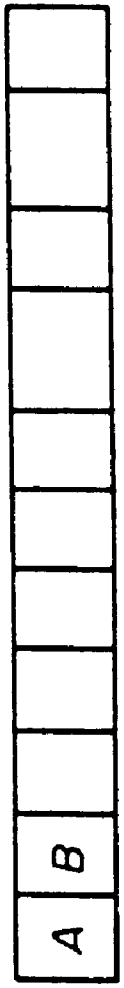
FIG. 11 shows an illustration of contents of "1: CONTROL SOFT MANAGEMENT" included in the additional information packet shown in FIGS. 10A and 10B.

The element 1, "control software management" has, as shown in FIG. 11, the following information A and B:

A: a software version; and
B: revision.

Figure 12:
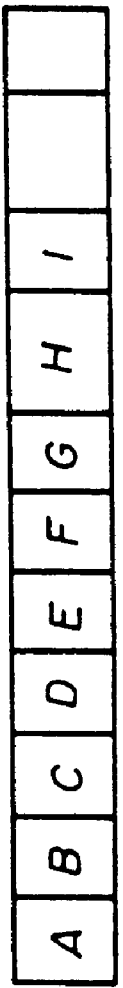
FIG. 12 shows an illustration of contents of "2: ORIGIN INFORMATION" included in the additional information packet shown in FIGS. 10A and 10B.

The element 2, "origin information" has, as shown in FIG. 12, the following information A through I:

A: information concerning utilization of other file(s) of information: 0 when not utilizing, and 1 when utilizing;
B: a number of utilized files of information;
C: origin information for the first utilized file of information and origin information concerning a portion of the first utilized file of information, which portion of the first utilized file of information is used in the current file of information:
0 when the first utilized file of information has come from the present apparatus; 1 when the first utilized file of information has come from another apparatus; further including information indicating ID of the first utilized file of information, a page number, and coordinates of the portion having been extracted therefrom; further including the editing application (not necessary when the corresponding collection of main information is not attached); further including low level information (not necessary when the corresponding collection of main information is not attached); further including position indicating information: 0 when an entire page has been added; 1 when only partially joined; the position indicating information further including a page number to which page the extracted page is to be added or coordinates of to which the portion is to be joined; and D: origin information for the second utilized file of information and origin information concerning a portion of the second utilized file of information, which portion of the second utilized file of information is used in the current file of information:
(contents being the same as those shown above for the first utilized file of information, thus description for the second utilized file of information being omitted)

The element 3 "Importance degree" has, as shown in FIG. 13, the following information A through D:

A: a rank of importance: 0 when ranking is not used, and 1 when ranking is used;
B: a number and a position, in the current file of information, corresponding to a ranking level 1:
C: a number and a position, in the current file of information, corresponding to a ranking level 2: and
D: a number and a position, in the current file of information, corresponding to a ranking level 3.

The element 4 "Output rank control" has, as shown in FIG. 14, the following information A through D:

A: a rank of importance: 0 when ranking is not used, and 1 when ranking is used;
B: a number and a position, in the current file of information, corresponding to a ranking level 1:
C: a number and a position, in the current file of information, corresponding to a ranking level 2; and
D: a number and a position, in the current file of information, corresponding to a ranking level 3.

Figures 15, 16:
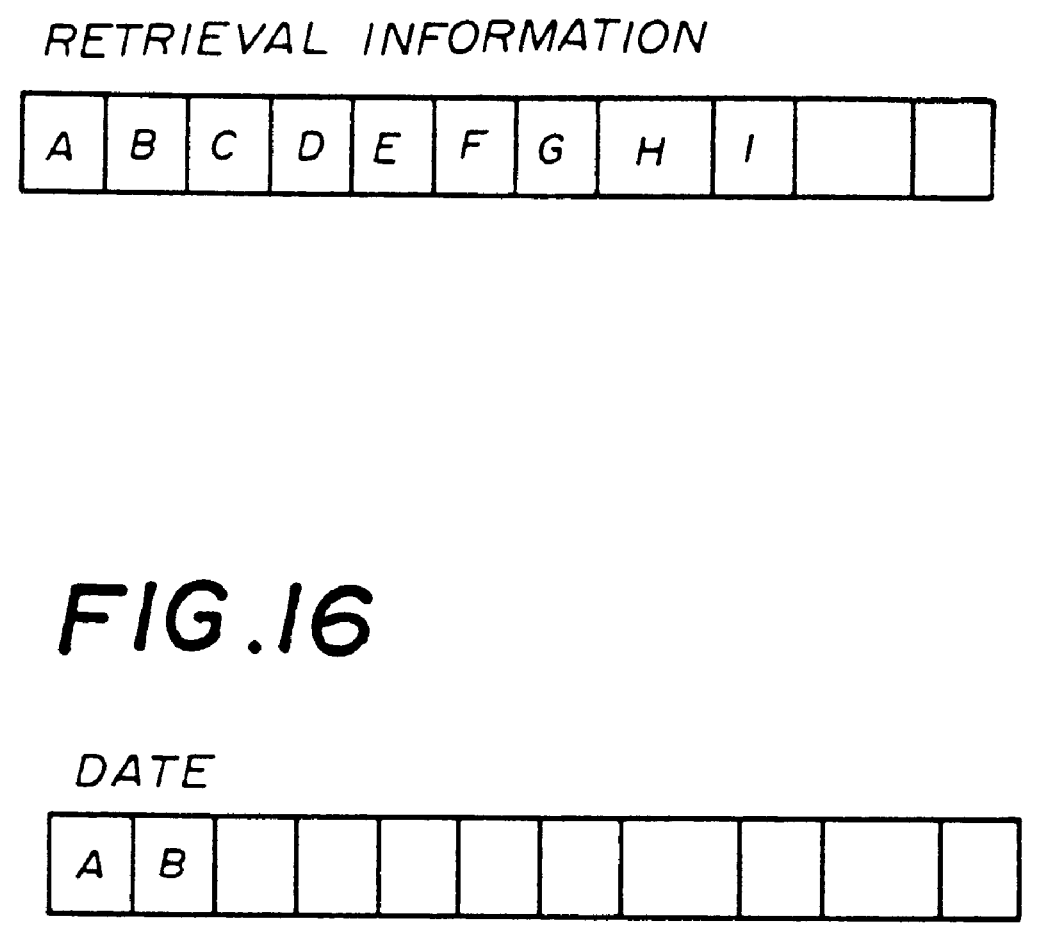

The element 5, "Retrieval information" has, as shown in FIG. 15, the following information A through I:

A: a retrieval information: 0 when the retrieval information is not used; 1 when the retrieval information is used; and
B through I: items to be used for reference, according to which items a retrieval is executed.

The element 6, "date" has, as shown in FIG. 16, the following information A through D:

A: date attribute: 0 when the date attribute is not used; 1 when the date attribute is used;
B: date when the current file of information has been produced;
C: date when the corresponding collection of main information has been produced; and
D: date when the corresponding additional information packet has been produced.

The element 7, "application" has, as shown in FIG. 17, the following information A through D:

A: information editing application: 0 when the application is not used; 1 when the application is used:

B: ID No. of the application;

C: information retrieval application: 0 when the application is not used; 1 when the application is used: and B: ID No. of the application.

The element 8, "Low level information" has, as shown in FIG. 18, the following information A through F:

A: a resolution of the corresponding image;

B: a size of the image when it is read of the original image:

C: a contrast of the read image:

D: a luminance of the read image:

E: TEXT/PHOT process: and information concerning a kind of compression when the corresponding image information has been compressed.

Then, the new file of information, obtained as a result of using the extracted part "C" of the image, has a corresponding collection of main information MD2 and an additional information packet SD2 as shown in FIG. 10B. The collection of main information MD2 comprises the extract part "C" and the additional information packet SD2 has elements 0 through 8.

The respective elements 1 through 8 of the additional information packet SD2 correspond to the respective elements 1 through 8 of the above-mentioned additional information packet SD1 shown in FIG. 10A. The contents of the elements of the additional information are shown in the example below:

The element 1: the information of "Control software management" is omitted (thus this position contains no information):

The element 2: "Origin information":

A: information utilization: utilizing: 1;

B: a number of utilized files: 1:

C: origin information and for the first utilized file of information and origin information concerning portion of the first utilized file of information, which portion of the first utilized file of information have been used in the current file of information:

from the present apparatus: 0; the information ID; the corresponding page number; the corresponding coordinates;

the corresponding editing application ID No.;

the corresponding low level information; and the corresponding position: extraction; and X/Y coordinates of the joined position.

The elements 3 and 4: "importance degree" and "output rank control":

None (when the ranking is used, only an allowed user can execute the extraction).

The element 5: "retrieval information": None.

The element 6: "date": The date attribute is not used, thus 0.

The element 7: "application":

A: Editing application: used, thus 1:

B: ID No.

The element 8: "low level information":

Only the size of the image has been modified, other information is the same as that of the additional information packet of the utilized file of information.

Following will be described, with reference to FIG. 19, an example of a new, third, file of information, obtained as a result of joining the extracted part "C" of the image of the first file of information with the second file of information.

The example of the file of information has the corresponding collection of main information MD3 and the corresponding additional information packet SD3. The collection of main information MD3 comprises the image information corresponding to the image S2 having a rectangular shape formed by the solid line and the other image information corresponding to the above-mentioned extracted part "C" of the image, which extract part has been joined to a part of the image S2. The additional information packet SD3 has elements 0 through 8. The respective elements 1 through 8 of the additional information packet SD3 correspond to the respective element 1 through 8 of the above-mentioned additional information packet SD1 shown in FIG. 10A. The contents of the elements of the additional information are as in the example:

The element 1: The information of "Control software management" is omitted (thus this position contains no information):

The element 2: "Origin information":

A: information utilization: utilizing, thus 1;

B: a number of utilized files: 1:

C: origin information and for the first utilized file of information and origin information concerning portion of the first utilized file of information, which portion of the first utilized file of information have been used in the current file of information:

From the other apparatus, thus 0; the information ID; the corresponding page number; the corresponding coordinates;

the corresponding editing application ID No.;

the corresponding low level information; and the corresponding position: partial joining; and X/Y coordinates of the joined position.

The elements 3 and 4: "importance degree" and "output rank control": None.

The element 5: "retrieval information": None.

The element 6: "date": The date attribute is not used, thus 0.

The element 7: "application":

A: Editing application: used, thus 1:

B: ID No.

The element 8: "low level information":

Only the size of the image has been modified, other information is the same as in the additional information packet of the second file of information, which second file comprises the image S2.

Figure 19:
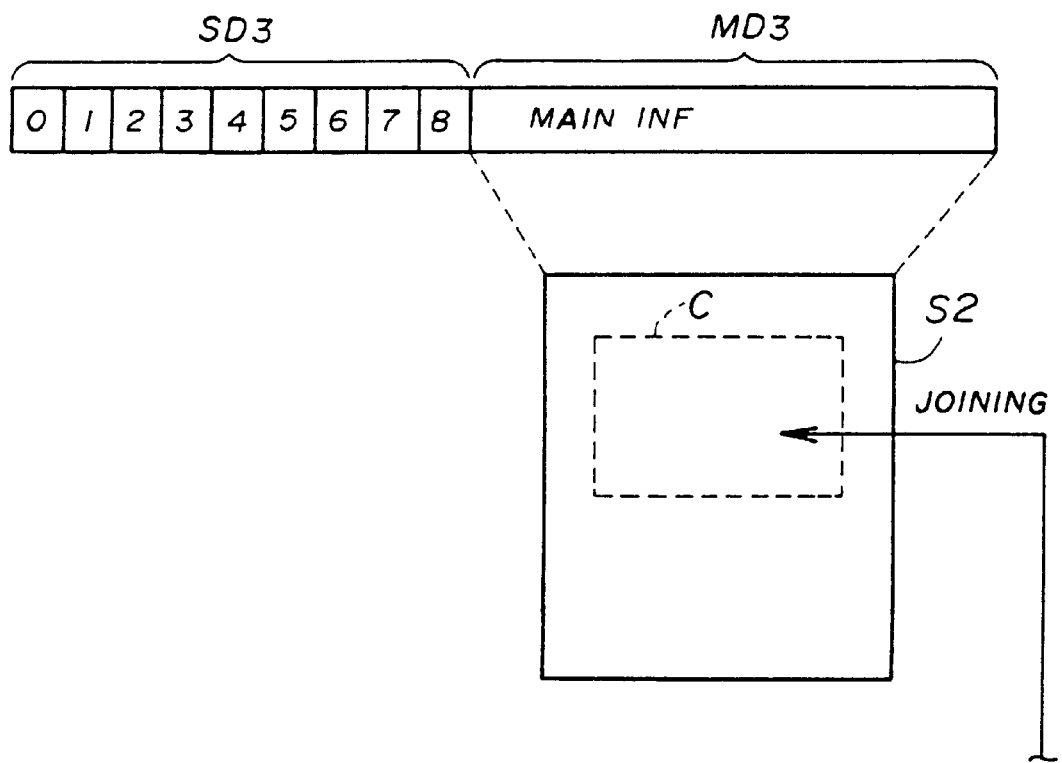
FIG. 19 shows illustrations of the joining process shown in FIG. 8, and for a fourth additional information packet of the fourth file of information.

As shown in the above-mentioned example of FIG. 19, use of the additional information packet having the information (ID No.) specifying the application software that has been used for producing the corresponding collection of main information enables the present apparatus to process a collection of main information that cannot be read or that cannot be modified/deleted/edited without the corresponding application software. Thus, the above-mentioned problem, occurring as a result of a system incompatibility can be solved, and editing of the information can be facilitated.

If the file of information has the collection of main information and the corresponding additional information packet according to the present invention, the collection of main information may be formed as a result of utilizing an application software such as a generally used word processing software and a table calculation software, the corresponding additional information packet having the ID No. of the respective software. In this example, these application software program may themselves be included in the corresponding additional information packet, depending on the data quantity of the software.

Further, in the case where the additional information packet of the above-mentioned third file of information, which has been obtained as a result of joining the extracted part of the first file of information with the second file of information, is to be modified, the driving of the application software having been joined to the corresponding additional information packet facilitates the modification.

A limitation for limiting deletion of the file of information produced as a result of joining a collection of information with the corresponding additional information packet may enable the corresponding file of information to be automatically deleted as a response to a condition for releasing the limitation being fulfilled.

Such a condition for permitting the deletion may comprise, for example, a deletion date, no response against warning of the deletion, a threshold using frequency (a file of information used frequently may not be deleted), and so on. Such a system, in which undesirable file of information being stored those being undesirable, are automatically deleted, facilitates management of the files of information, and the system enables constant efficient usage of the capacity of the storing device.

Normally, the collection of main information can be read without use of the additional information packet because of the standardized configuration thereof. In another example of the file of information having the collection of main information and the additional information packet according to the present invention, the collection of main information may be coded, the additional information packet having information for decoding the coded collection of main information. By such a method, unauthorized disclosure of information having output limitations can be prevented.

In another example of the file of information as per the present invention, passwords may be included in the corresponding additional information packet for a purpose of limiting output of the corresponding collection of main information. As a result, secrecy of information of limited access can be ensured. (for output (displaying, printing, transmission, or other output) of the information)

Figure 4:
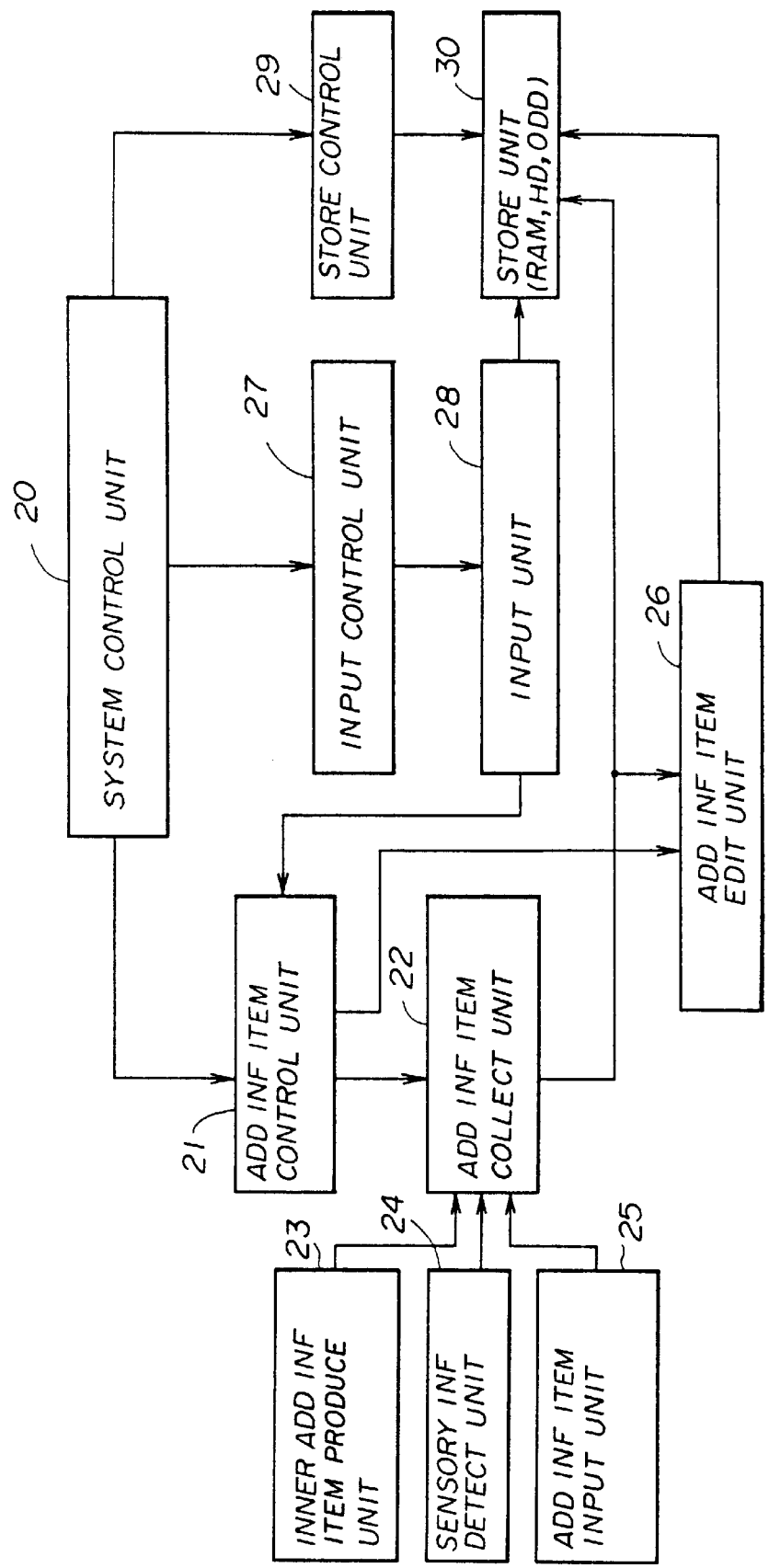
FIG. 4 shows a function block diagram for producing a file of information in an electronic filing apparatus according to a first embodiment of the present invention.

Further, if the produced file of information is to be output through the optical disc 9 by using the ODD 8 shown in FIGS. 2 and 3 or is to be transmitted through the communication unit 6, when using the additional-information packet control unit shown in FIG. 4 having the additional-information packet controlling means for controlling a sequence of the elements of the additional information packet and/or an increase and/or a decrease in a number of the elements thereof, a part or all of the additional-information packet controlling software used in the additional-information packet controlling means may be preferably joined with the corresponding file of information. This joining may be performed by joining the information corresponding to the software so as to be included in the corresponding additional information packet, or this joining may be performed by joining the information corresponding to the software with the corresponding file of information but it is not included in the additional information packet.

Basically, the file of information output of the present apparatus, as mentioned above, cannot be read by another identical apparatus that has a system different from that of the present apparatus. This is because data configuration of the corresponding collection of main information cannot be recognized by the other apparatus. However, the file of information, the (not coded) corresponding collection of main information, and the collection of main information formatted according to a standardized format such as TIFF, may be read in the low level field. Such a method for enabling use of the file of information by the other apparatus is difficult and troublesome because transfer of the file of information is not sufficiently managed.

The above-mentioned joining of the additional-information packet controlling-information (software) with the corresponding file of information enables a present apparatus having received the file of information produced by the other external apparatus to convert the original additional information packet of the received file of information to the other additional information packet thus adapting to the system of the present apparatus. This conversion is executed as a result of analyzing the additional-information packet controlling-information that has been joined with the received file of information.

Therefore, problems occurring as a result of a system incompatibility can be solved, further a speedy processing of the file of information can be realized, and management of the files of information can be made easier.

In this conversion, as information for this conversion has been previously written in the additional-information packet controlling-information. Information indicating the configuration of the corresponding collection of main information, the origin information, and other information that does not have to be changed is not changed in basic contents thereof, but the sequence of elements that constituting this information may be changed as desired. Further, if information may be included in the file of information, which information cannot be converted at the application level, an analyzing tool may be provided such as that for requesting the operator, when the corresponding file of information is registered or read, to specify whether or not such un-convertible information may be deleted or how it may be modified.

Further, functions for sorting and retrieval of the files of information in the electronic filing apparatus according to the first embodiment of the present invention will now be described with reference to FIG. 20.

The functions are executed by the system control unit 20, the store control unit 29, the storing unit 30 (they are also shown in FIG. 4), a retrieval control unit 31, a retrieval unit 32, a reference information input unit 33, an output control unit 34, an output unit 35, a main information retrieving/producing unit 36 and an additional-information packet managing unit 37.

Figure 20:
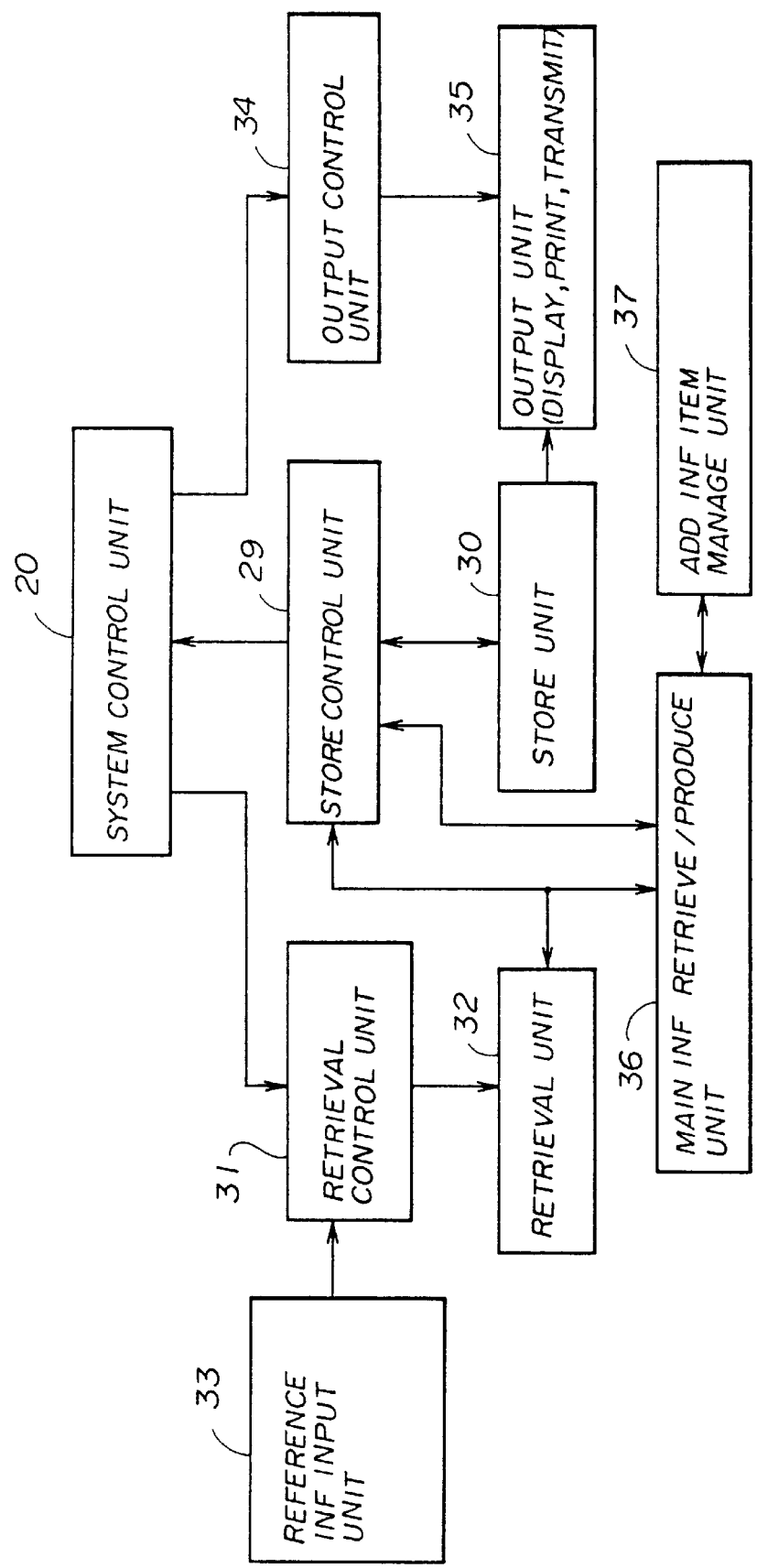
FIG. 20 shows a function block diagram for sorting and/or retrieval of the files of information in the electronic filing apparatus using the first embodiment of the present invention.

The system control unit 20, store control unit 29 and storing unit 30, those executing the functions for producing the file of information in FIG. 4, then execute the functions for sorting and retrieval of the file of information in FIG. 20.

The retrieval control unit 31 controls the reference information input unit 33, comprising devices such as the keyboard and mouse, so as to input reference information specified by the operator, then the retrieval control unit 31 controls the retrieval unit 32 so as to cause it to retrieve the desired file of information in accordance with the reference information.

The retrieval unit 32, in response to a directive specified by the retrieval control unit 32, then retrieves the additional information packet having been managed in a predetermined table or in the additional-information packet managing unit 37. As a result, the retrieval unit 32 causes the main information retrieving/producing unit 36 to retrieve or to produce the collection of main information of the desired file of information. Further, the retrieval unit 32 transfers information obtained as the result of the retrieval to the store control unit so as to cause it to read the desired file of information.

The output unit 35, the means comprising the indicating unit 4, the printer 5, and the communication unit 6 shown in FIGS. 2 and 3, for outputting information, under the control of the output control unit 34, displays, or prints out the collection of main information of the file of information read by the storing unit 30, or transmits it after attaching the corresponding additional information packet.

The main information retrieving/producing unit 36 retrieves the collection of main information or produces the collection of main information, as a result of using the additional information packets of the plurality of files of information that have not had the corresponding collections of main information attached thereby. Further, the main information retrieving/producing unit 36 may produce the quite new collection of main information as a result of combining the additional information packets of a plurality of files of information.

The additional-information packet managing unit 37 automatically sorts the many collections of main information and the additional information packets produced as mentioned above, based on the corresponding additional information packets.

For this purpose, the additional-information packet managing unit 37 has means for separating the respective files of the plurality of files of information into the respective additional information packets and the respective collections of main information after relating them to each other by the corresponding identification codes. Further, the additional-information packet managing unit 37 has means for sorting only the separated respective additional information packets. An alternative is that the additional-information packet managing unit 37 may comprise means for sorting only the separated respective additional information packets, the means further attaching to the respective additional information packets, respective information comprising respective parts of the respective collections of main information, or respective information obtained as a result of simplifying the respective collections of main information.

Further, the following means may be provided: means for sorting information elements of the respective additional information packets of the plurality of files of information or for linking the information elements corresponding to the respective common attributes, or other means for separating the respective additional information packets of the plurality of files of information into the information elements of the respective additional information packets. The latter means further collects the information elements corresponding to of the respective common attributes, and the latter means attaches corresponding identification codes predetermined for the respective collections of the main information, the identification codes being used for reconstructing the desired additional information packet as a result of collecting the separate information elements.

Additional-information packet reconstructing means may also be provided. When the retrieval is executed, the retrieval unit 32 produces the reference information indicating a collection of the specified desired information elements corresponding the respective common attributes. Then, the additional-information packet reconstructing-means retrieves the information elements in accordance with the reference information, the additional-information packet reconstructing-means then grouping the retrieved information elements into groups so as to reconstruct the additional information packets corresponding to the respective groups, in each of which groups the information elements have identical identification codes.

In the case where the additional-information packet reconstructing-means is employed, other means may also be provided such as: ranking means for ranking the reconstructed additional information packets in accordance with a degree of similarity in the information elements between the specified reference information and the reconstructed additional information packets, and means for storing frequently retrieved additional information packets of the reconstructed additional information packets, the means deleting additional information packets that have not been retrieved for a predetermined period of time.

In the first embodiment of the present invention, a file of information that has been read in one system of the electronic filing apparatus, is separated into the corresponding additional information packet and the corresponding collection of main information after the two parts are related to each other by means of ID (an identification code). Then, for example, the additional information packet is stored in the RAM and the collection of main information is stored in the magnetic disc device. When the corresponding file of information is sorted or is retrieved, only the corresponding additional information packet is dealt with, the corresponding collection of main information not being used.

The collection of main information is retrieved by using the corresponding ID only when it is needed. Therefore, occasions when the collections of main information, having the relatively larger data volume, are processed can be reduced. Thus, a speedy sorting/retrieving process can be realized.

When only the additional information packets are being sorted, the process speed may become faster as a result of a part of the corresponding collection of main information being added to the additional information packet. The above part of the corresponding collection of main information comprises, for example, the first page of the collection of main information. An alternative is that information obtained as a result of simplifying the corresponding collection of main information, may be added to the additional information packet. The above simplified collection of main information comprises, for example, information obtained as a result of reducing information volume thereof by reducing a resolution from 600 dpi to 100 dpi.

Further, the collections of main information can be produced or can be retrieved automatically by using respective information of the corresponding additional information packets. Thus, it may not always be required that the additional information packets and the corresponding collections of main information exist as matched pairs. That is, the additional information packets substantially have all, or respective parts of, the corresponding collections of main information. A duplicated storage of the same information can be then prevented. Thus, an efficient usage of the memory capacity can be realized, and a greater number of the files of information can be stored.

For example, as mentioned above, in the case where the collection of main information of the new second file of information has been made using a part extracted from another collection of main information of the first file of information, the second file of information does not need to have the extracted part of the collection of main information of the first file of information attached thereto as a result of the additional information packet of the second file of information having identification information corresponding to the first file of information and coordinate information corresponding to the portion extracted therefrom. When the collection of main information of the second file of information is displayed or printed out, the corresponding extracted part of the collection of main information of the first file of information may be retrieved in accordance with the corresponding information of the additional information packet of the second file of information.

Processes for such an extraction of a part of the collection of main information are substantially the same as processes when extraction is made by utilizing a single page or a plurality of page and also as processes when the extraction is made by utilizing all of the collection of main information.

Further, it is possible that the new collection of main information is automatically produced or retrieved as a result of combining of the additional information packets of the plurality of files of information.

That is, by specifying necessary items, the new collection of main information may be produced as a result of editing the necessary items, the resulting collection of main information being then printed out very easily.

In an example of operations, the present invention may be applied to an electronic filing apparatus for managing patent information. It may be specified that, for example, a document, having an A4 size, has to be created as a result of extracting: the titles of inventions, the classes of the inventions, the descriptions of the claims of the inventions from all patent documents concerning "Marker retrieval" between 1960–1990. The request can be easily fulfilled. Then, when the resulting document is registered as a new file of information, the collection of main information is not needed, as mentioned above, further the file of information having only the corresponding additional information packet may be registered.

Further, for sorting the additional information packets of the plurality of files of information, instead of arranging them so as to form a tree configuration, a method of sorting of elements of the additional information packets according to contents of the respective elements, or another method of linking (grouping) the elements having to respective common attributes may realize more speedy retrieval.

Figure 21:
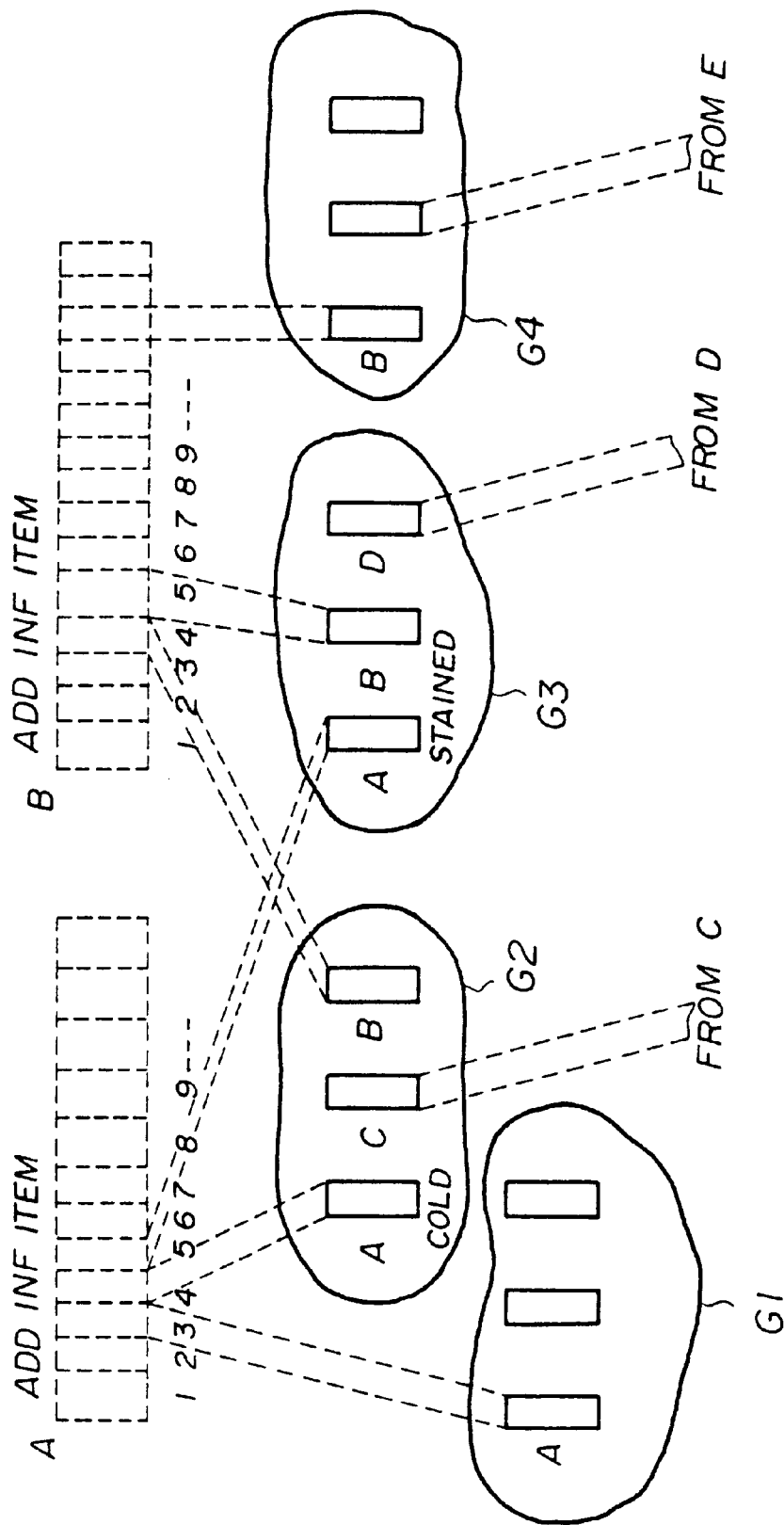
FIG. 21 shows an illustration of an example of a sorting system for sorting additional information packets of the plurality of files of information in the electronic filing apparatus.

Such a method for sorting the additional information packets will now be described with reference to FIG. 21. The many additional information packets A, B, C, . . . (these capital letters indicate ID numerals corresponding to the respective additional information packets) respectively have respective pluralities of information elements such as 1, 2, 3, . . . , respectively indicated by rectangles formed by dashed lines. Then, the respective additional information packets are respectively separated one by one into the information elements. Then, among the separated information elements, the information elements corresponding to respective common attributes are collected together in respective groups. As a result, a plurality of groups G1, G2, G3, G4, . . . are formed, each group being surrounded by a solid curved line, such operations being sorting operations.

In this example, each of the additional information packets A and B has information elements respectively corresponding to a human operator's sensory impressions "cold" and "stained". The information elements corresponding to "cold" are sorted to the group G2 and the information elements corresponding to "stained" are sorted to the group G3, respectively after being separated.

The reference information is specified, as shown in FIG. 22 for example, the reference information including information elements "(1) cold" and "(2) stained". Then, the entirety of the files of information registered need not be searched, but only the group G2 corresponding to the information element "cold" and the group G3 corresponding to the information element "stained". Then, in accordance with ID (or ID numerals) of the information elements included in both the groups G2 and G3, the ID having been respectively attached to the respective information elements before they were separated, using the ID corresponding to the respective collection of main information, that is, the ID corresponding to the respective additional information packets, the corresponding additional information packets are reconstructed as a result of collecting the information elements having the corresponding ID. Then, by using the reconstructed additional information packets, the corresponding collections of main information are reconstructed.

In this example, the ID of the additional information packets A and B are included in both the groups G2 and G3. Thus, the additional information packet A is reconstructed as a result of collecting the corresponding information elements from all of the groups, which include the information elements having the ID of the additional information packet A. Similarly, the additional information packet B is reconstructed as a result of collecting the corresponding information elements from all of the groups, which include the information elements having the ID of the additional information packet B. Thus, the collections of main information corresponding to the ID A and B are obtained as a result of the retrieval.

Further, after reconstruction of the additional information packets, ranking of the reconstructed additional information packets in accordance with degrees of similarity in the information elements between the specified reference information and the reconstructed additional information packets may be performed, as a result of counting how many of the information elements of the specified reference information are identical to elements of the information elements of the reconstructed additional information packets.

Further, reconstructed additional information packets that are retrieved (referred to) frequently, are not separated again, but are stored (in RAM) as desired. As a result of this storing, when this additional information packet is retrieved again, as repeated reconstruction of the additional information being eliminated, a speedy retrieval thereof can be realized. Further, reconstructed additional information that has not been retrieved (referred to) for a predetermined period of time may be deleted, efficient usage of the memory thus being realized.

Further, the electronic filing apparatus according to the second embodiment of the present invention will now be described with reference to FIGS. 23 through 32. In the electronic filing apparatus, plane information may be used in the additional information packet by utilizing a reference coordinate plane. Hereinafter, the term "a document" may mean the file of information according to the present invention or it may mean the collection of main information according to the present invention.

Figure 23:
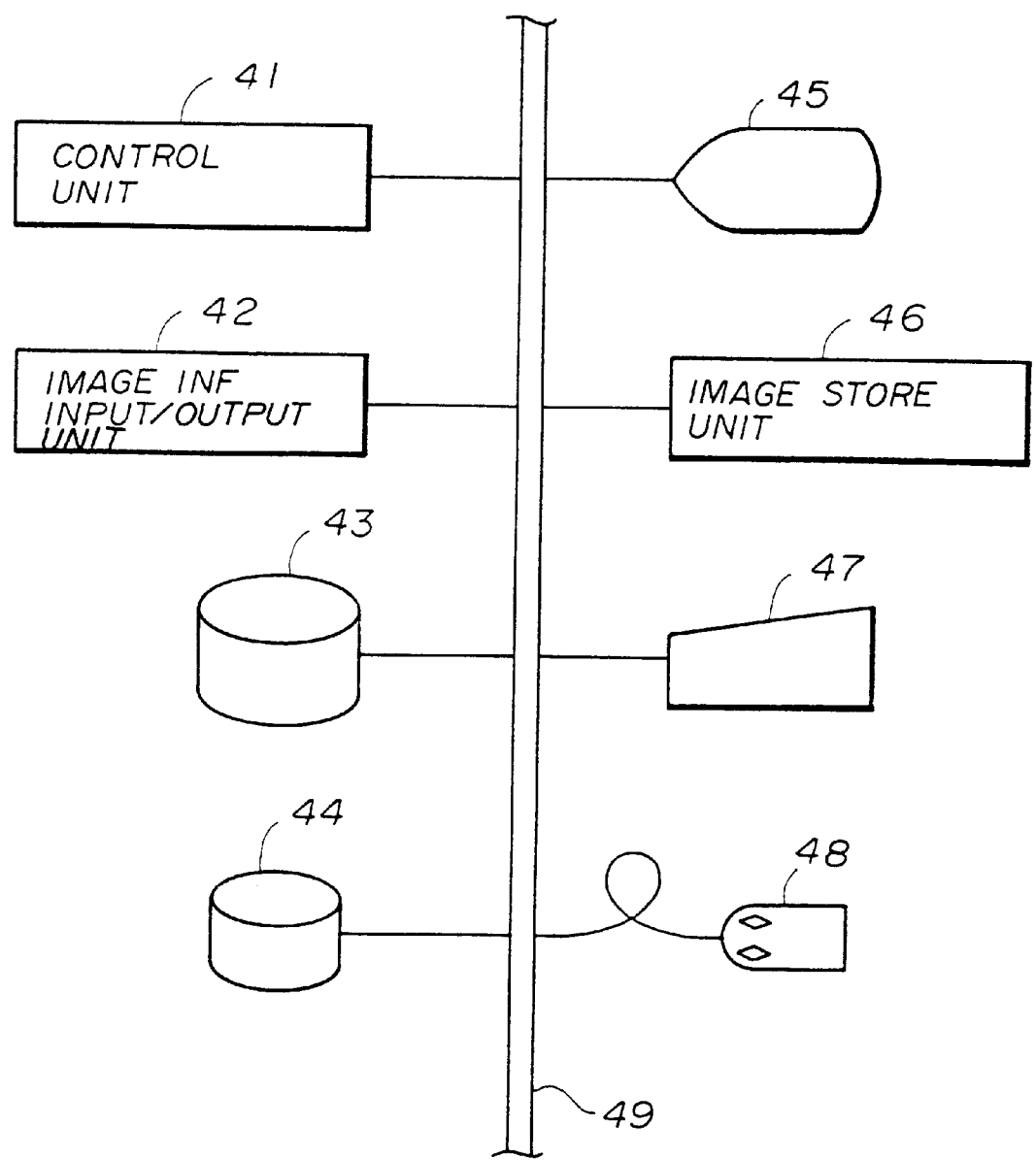
FIG. 23 shows a block diagram of an essential part of a document registering/retrieving apparatus employing a second embodiment of the present invention.

A hardware configuration of the electronic filing apparatus, that is, the document register/retrieval apparatus, will now be described with reference to FIG. 23. The electronic filing apparatus has a control unit 41, an image information input/output unit 42, a document storing unit 43 for storing documents such as an image information, a document storing unit 44 for storing documents for register/retrieval, an image display unit 45, an image storing unit 46, a keyboard 47, a position information input unit (mouse) 48, and a system bus 49.

Figure 27:
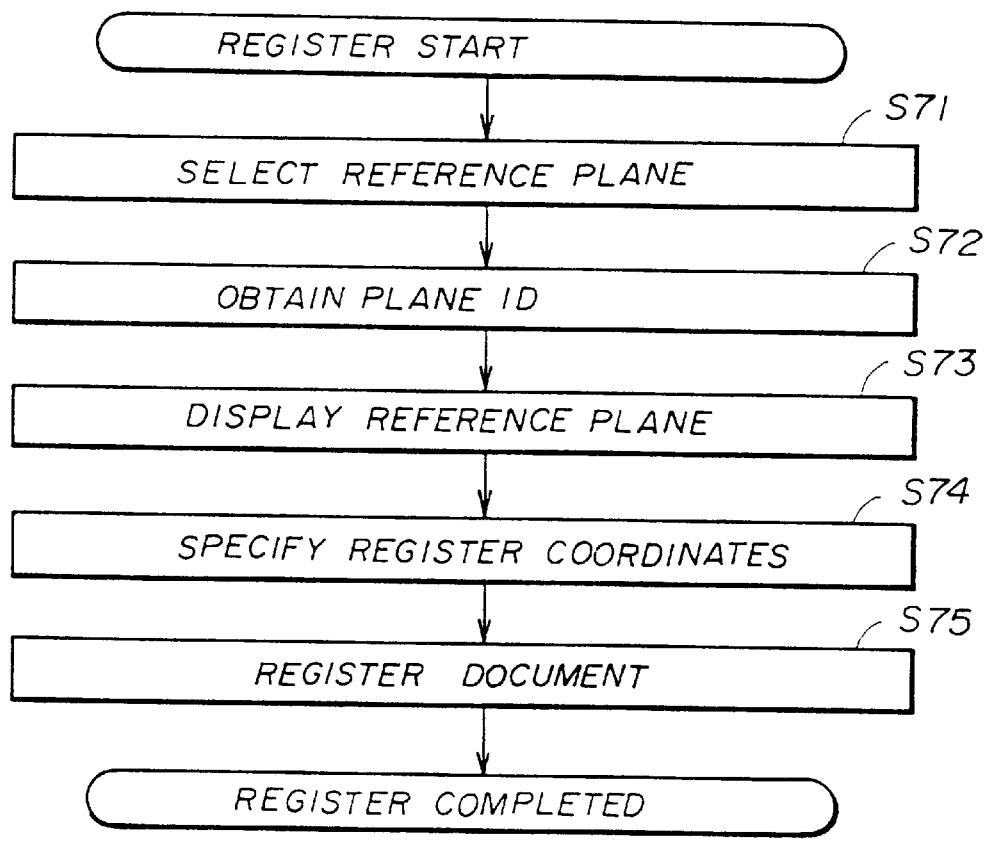
FIGS. 27 and 28 respectively show two examples of essential operation flows for registering in the registering/retrieving apparatus shown in FIG. 23.
Figure 30:
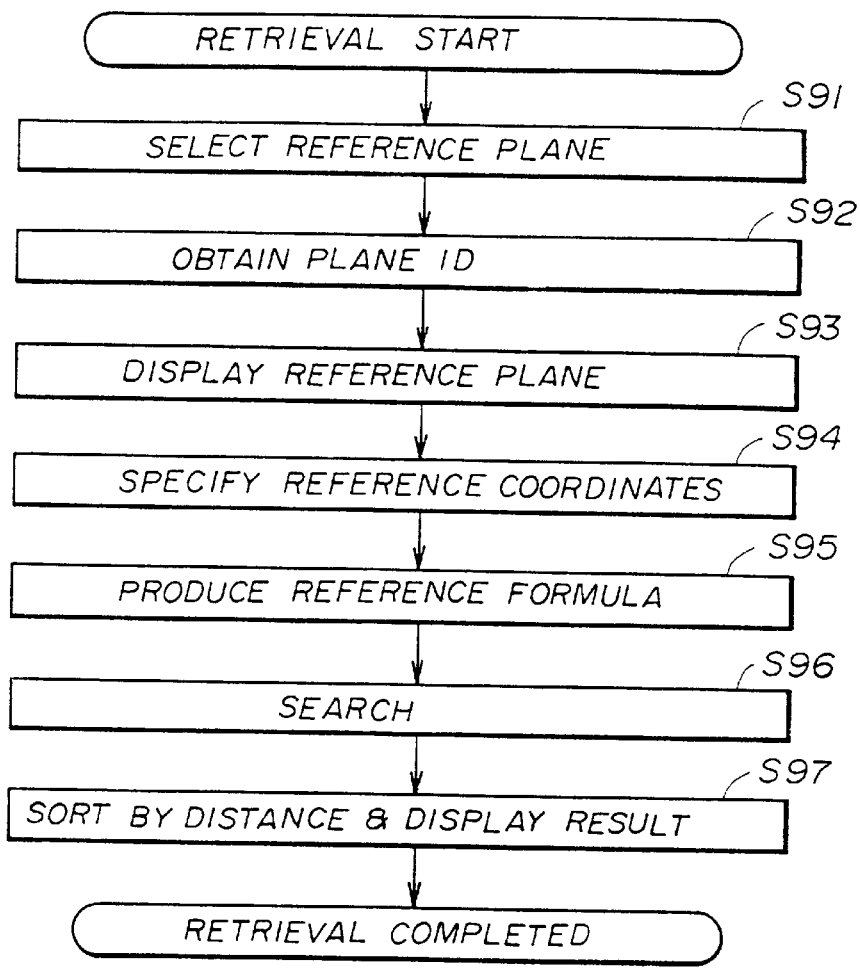
FIG. 30 shows an example of an essential operation flow for the retrieving process in the registering/retrieving apparatus shown in FIG. 23.
Figure 32:
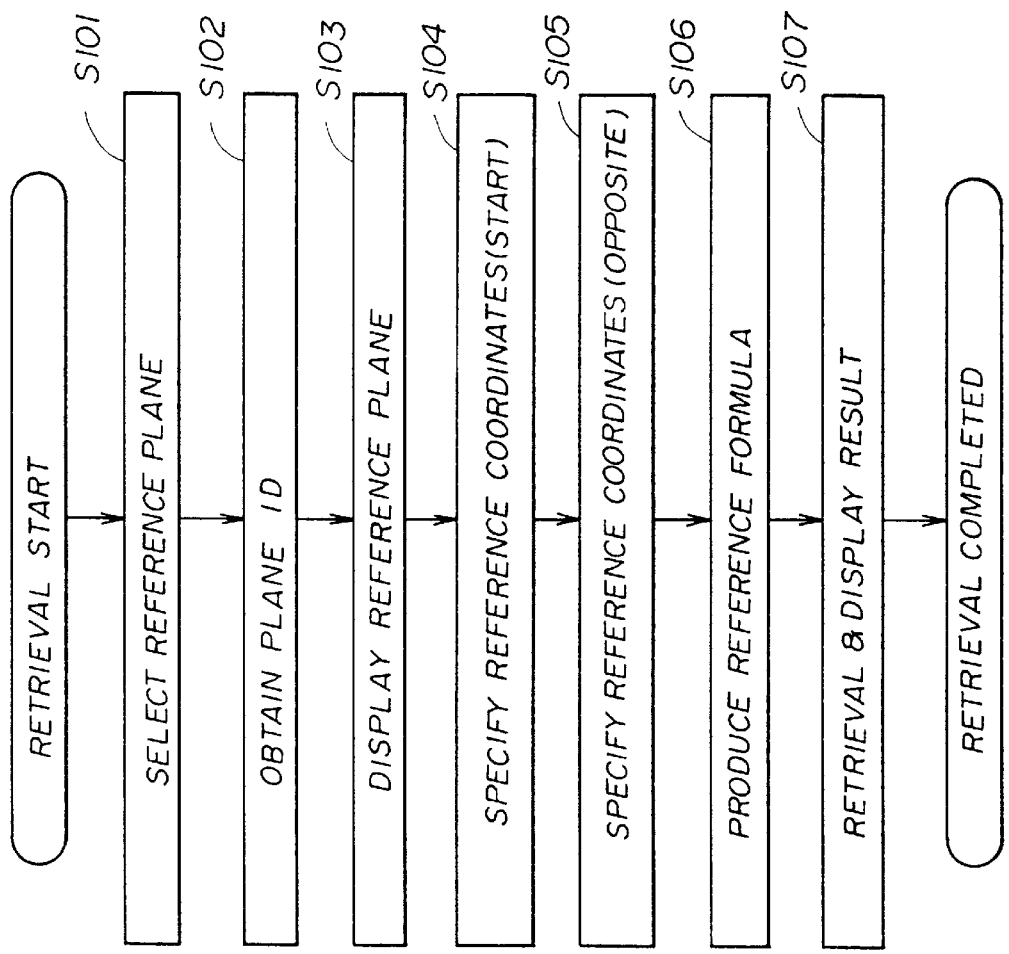
FIG. 32 shows another example of an essential operation flow for the retrieving process in the registering/retrieving apparatus shown in FIG. 23.

The hardware configuration of the document register/retrieval apparatus is, basically, similar to that of the electronic filing apparatus according to the first embodiment of the present invention. The control unit 41 corresponds to the computer comprising the CPU 10, ROM 11 and other devices. The image information input/output unit 42 corresponds to the scanner 3 for inputting the image information, the printer 5 for outputting the image information, and the communication unit 6 for transmitting and receiving the image information. The image storing unit 46 corresponds to the image memory 12. Further, the control unit 41 executes processes particular to the register/retrieval apparatus according to the second embodiment of the present invention, such as shown in FIGS. 27, 30, and 32.

A reference coordinate plane utilized in the register/retrieval apparatus according to the second embodiment will now be described. The reference coordinate plane may represent attributes indicatable on a graph, or the reference coordinate plane may represent information corresponding to positions located on a map or positions located on a construction diagram.

One example of the reference coordinate plane will now be described with reference to FIG. 24. The reference coordinate plane of the figure includes five figures a through e and two intersecting lines f and g perpendicular to each other.

Such figures and lines may be predetermined as desired, the figures and lines being utilized for representing positions (aims) on the plane, which positions are specified by the operator. Thus, the sizes and the arrangement of the figures and lines may be predetermined as desired.

That is, any picture may be used for the reference coordinate plane in which picture general coordinate positions thereon can be recognized. Further plural kinds of reference coordinate planes may be employed.

Further, processes in which documents (including image information) are registered will now be described with reference to FIG. 27.

The operator has to select in S71 the reference coordinate plane, from the plurality of reference coordinate planes, for registering the document that has been input through the scanner or other device, or that has been produced in the present document register/retrieval apparatus. Then the ID of the selected plane is obtained (S72). In a case where the present document register/retrieval apparatus employs only one reference coordinate plane, the steps S71 and S72 are not necessary. Then, the predetermined reference coordinate plane shown in FIG. 24 is displayed on the screen of the image display unit 45 as a result of the selection, or without selection in the case where only one reference coordinate plane is employed. Simultaneously, a cursor K, shown in FIG. 25 as an arrow, for specifying a position on the plane is displayed in the reference coordinate plane (S73).

Figure 25:
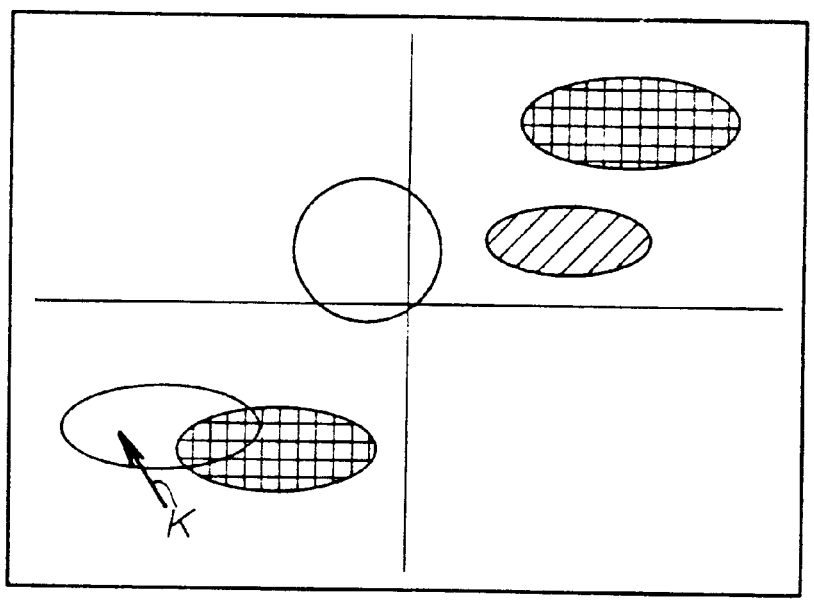
FIG. 25 shows the reference coordinate plane shown in FIG. 24, wherein a cursor for specifying a position in the reference coordinate plane is indicated.

On the image (reference coordinate plane) as shown in FIG. 25, the operator specifies a desired position by means of the position information input unit (mouse) 48 (S74), the coordinates of the position being thus obtained. In this example, coordinates of a position pointed at by the arrow cursor K become an attribute corresponding to the current document as a result of registering the document (S75) with the coordinate information corresponding to the position pointed at by the cursor K.

Figure 26:
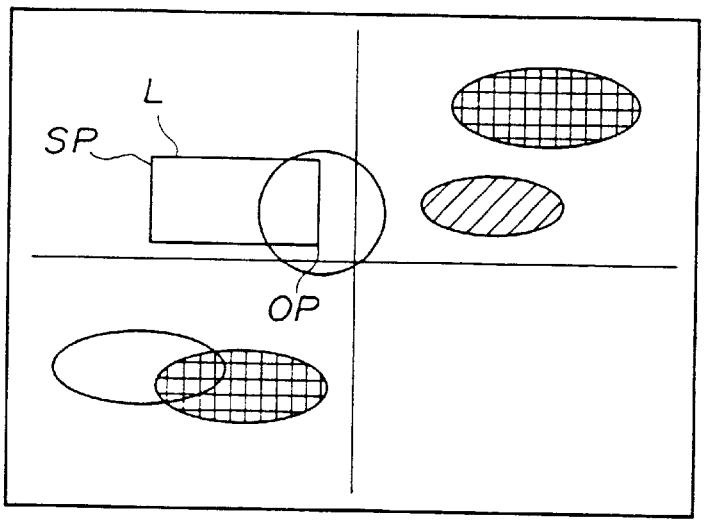
FIG. 26 shows the reference coordinate plane shown in FIG. 24, wherein a specified area in the reference coordinate plane is indicated, the specified area having been specified as a result of the opposing two vertexes of the specified area (having a rectangular shape) being specified by using the cursor.
Figure 28:
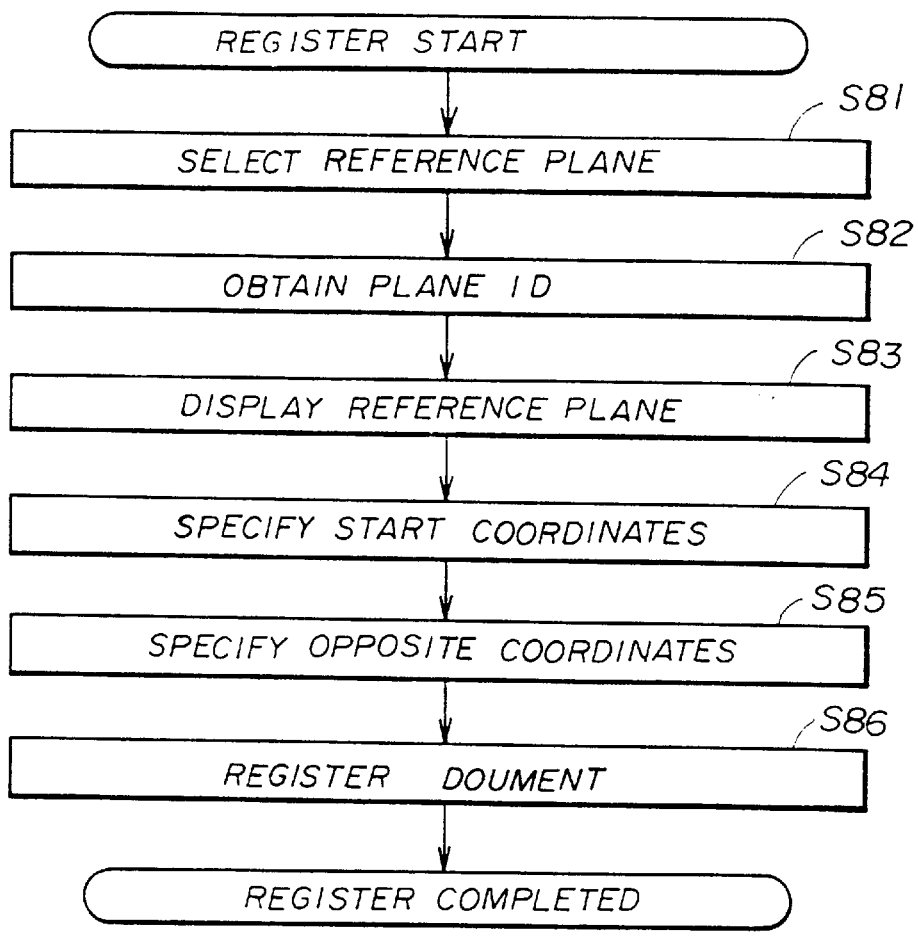

Alternatively, as shown in FIGS. 26 and 28, the operator may specify two position on the reference coordinate plane such as a starting position SP (S84) and a position OP located opposite to the position SP (S85) using the mouse 48. The steps S81, S82, S83 and S85 of FIG. 28 are substantially the same as the steps S71, S72, S73 and S75 shown in FIG. 27 respectively, the description for the steps S81, S82, S83 and S85 being thus omitted. In this case of FIG. 26, an area L in the reference coordinate plane having a rectangular shape is thus specified. Then, two sets of coordinates respectively specifying the two positions SP and OP, the two sets of coordinates specifying the area L, become an attribute of the present document. Further, the area to be specified may have a shape other than the rectangular shape of this example.

Coordinate information such as described with reference to FIGS. 24 through 28 may be employed in the corresponding additional information packet according to the present invention, the corresponding collection of main information comprising the document having been obtained through the scanner or other device, or having been produced in the present document register/retrieval apparatus as mentioned above. The collection of main information and the corresponding additional information packet constitute the file of information.

Figure 24:
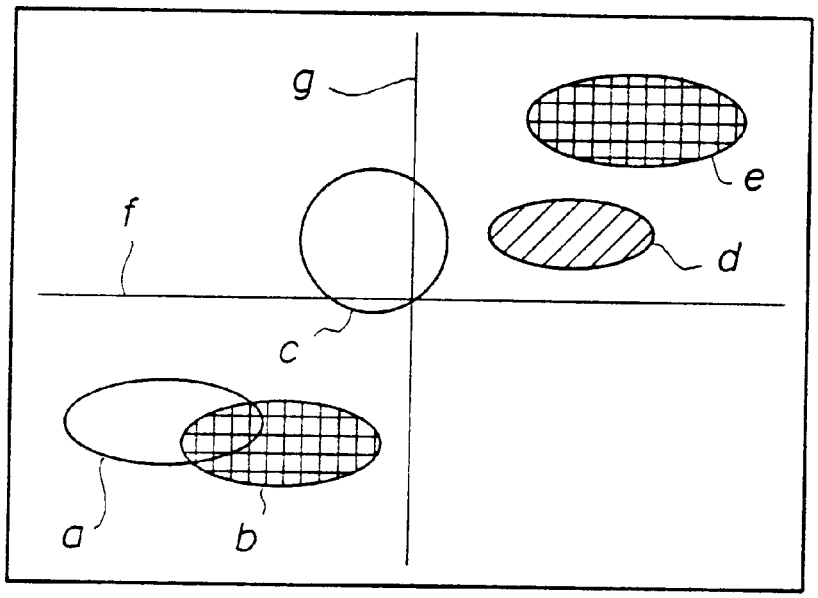
FIG. 24 shows an example for a reference coordinate plane for the registering/retrieving which reference coordinate plane is to be used in the registering/retrieving apparatus shown in FIG. 23.

The additional information packet also includes the corresponding ID for identifying the corresponding reference coordinate plane shown in FIG. 24. The resulting file of information is then stored and thus registered in the document storing unit 43 comprising the HDD or ODD. The additional information packet may further employ other index information, such as keyword, mainly for sorting and retrieval.

As described above, in the document register/retrieval apparatus according to the second embodiment of the present invention, the additional information packet acting as the index information for the corresponding collection of main information, has information of ID the same as ID having been assigned to the corresponding reference coordinate plane so as to retrieve the reference coordinate plane as desired, and has information indicating the corresponding coordinates on the reference coordinate plane. One or plural kinds of the reference coordinate planes may be provided. When the document (the file of information) is retrieved as shown in FIG. 30, a reference coordinate plane identical to that utilized when the corresponding document was registered is selected (S91) when a plurality of reference coordinate planes were employed in the registering. Then the reference coordinate plane is displayed on the screen (S93). Then, the desired document (the file of information, that is, the corresponding collection of main information) is retrieved on the corresponding reference coordinate plane, the document having been registered with the specification of the corresponding attribute specified as shown in FIGS. 25 or 26.

Figure 29:
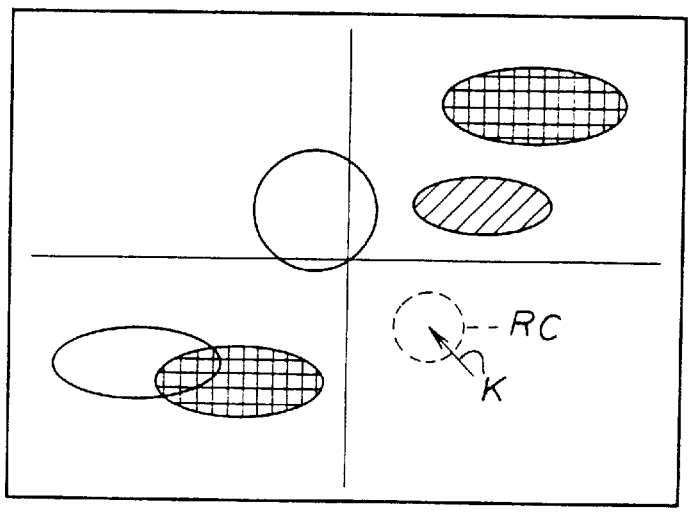
FIG. 29 shows the reference coordinate plane shown in FIG. 24, wherein the cursor for specifying a position in the reference coordinate plane in the retrieving process is indicated.

When the desired document is retrieved, as shown in FIG. 30, the operator selects a desired reference coordinate plane from the plurality of reference coordinate planes (S91). Then, the ID corresponding to the selected reference coordinate plane is obtained (S92). The steps S91 and S92 are not needed when only one reference coordinate plane is employed. Then, as shown in FIG. 29, the corresponding reference coordinate plane, as well as the cursor K, are displayed on the screen of the image display unit 45 (S93). Then, the operator specifies a desired position in the displayed reference coordinate plane by the operation of the mouse 48. Thus the coordinates corresponding to the position specified by the cursor K are obtained. In the example of FIG. 29, a search is actually performed with respect to a set of coordinates corresponding to an area indicated by a circle RC formed by a dashed line.

Then, the desired documents are retrieved (S96) in accordance with the ID obtained in S92 and the coordinates specified in S94 by using a reference formula produced in S95 as described below, as well as in accordance with other predetermined index information such as keywords.

Then, the retrieved documents (the files of information) are sorted (S97) in accordance with distances between the coordinates written in the additional information packets of the retrieved files of information and the coordinates specified in S94. Then, the result of the retrieval/sorting is displayed. This display may be executed by displaying at least a part of the corresponding collections of main information.

The retrieval in S96 is executed so that the collections of main information are retrieved, which collections of main information have been respectively attached by the corresponding additional information packets, so that distances between the coordinates of the additional information packets and the coordinates specified in S94 have to be shorter than a predetermined threshold distance. The sorting in S97 is executed as mentioned above, where the shorter the distance between the coordinates of the additional information packets and the coordinates specified in S94, the more important the corresponding collection of main information is considered to be.

The above-mentioned reference formula used in S95 will now be described. Here, the coordinates written in the additional information packet are p1: (x1, y1). The coordinates of the reference information specified in S94 are P1: (X1, Y1). In this case, the reference formula becomes the following formula (1):

$$(X1-x1)^2+(Y1-y1)^2<R^2 \quad (1)$$

Another example of the retrieval in the document register/retrieval apparatus according to the second embodiment of the present invention will now be described with reference to FIGS. 31 and 32. In the example of FIG. 29, the area for the search, and thus for the retrieval, has been specified by indicating one position. However, in this example of FIG. 31, the area LA for the search, and thus for the retrieval, will be specified by indicating two positions: a starting position SPA and a position OPA located opposite to the position SPA.

The steps S101, S102 and S103 of FIG. 32 are substantially the same as S91, S92 and S93 of FIG. 30 respectively, and hence a description thereof is omitted.

Then, as mentioned above, the two positions SPA and OPA are specified by using the cursor k, similarly to the process in the registering, as a result of twice specifying operations (S104 and S105).

After the rectangular area LA formed by a dashed line is specified in accordance with the two sets of coordinates corresponding to the positions SPA and OPA, the following reference formulas (2A) and (2B) are determined (S106):

$$X1<x1<X2 \quad (2A);$$

$$Y1<y1<Y2 \quad (2B).$$

Here, the coordinates written in the additional information packet are p1: (x1, y1). Further, in this case, both formulas (2A) and (2B) have to be fulfilled simultaneously. By searching using these formulas (2A) and (2B), the files of information corresponding to the additional information packets having the coordinates corresponding to the positions within the area LA are retrieved.

Further, there may be another case where each of the additional information packets has two sets of coordinates corresponding to two positions, the two sets of coordinates respectively being p1: (x1, y1) and p2: (x2, y2). In this case, the following formula (3) is determined (S107):

$$\{(X1<x1<X2) \text{ and } (Y1<y1<Y2)\};$$

or $$\{(X1<x1<X2) \text{ and } (Y1<y2<Y2)\};$$

or $$\{(X1<x2<X2) \text{ and } (Y1<y1<Y2)\};$$

or $$\{(X1<x2<X2) \text{ and } (Y1<y2<Y2)\} \quad (3).$$

By searching using these formulas (3), the files of information corresponding to the additional information packets having the coordinates corresponding to areas at least partially overlapping with the area LA are retrieved.

Figure 31:
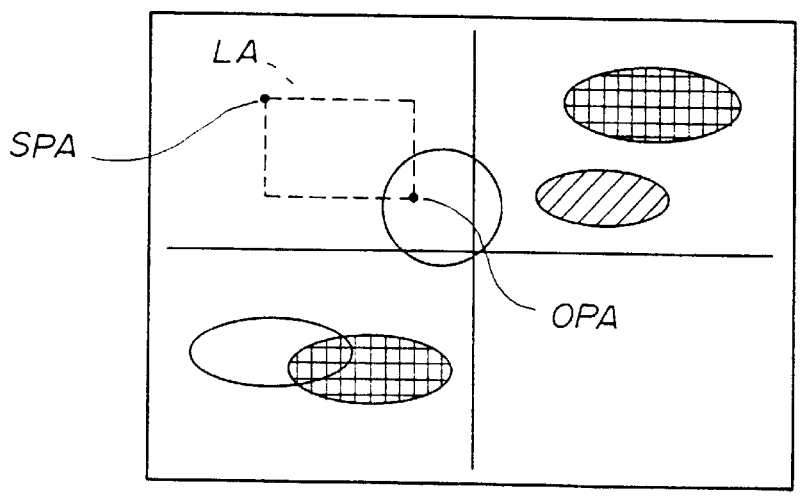
FIG. 31 shows the reference coordinate plane shown in FIG. 24, wherein a specified area in the reference coordinate plane is indicated, the specified area having been specified as a result of the opposing two vertexes of the specified area being specified by using the cursor, in the retrieving.

In the example of FIG. 31, as mentioned above, for the search/retrieval, the operator specifies an area such as a rectangular area, the desired files of information being then retrieved in accordance with the coordinates corresponding to positions within the specified area.

Figure 33:
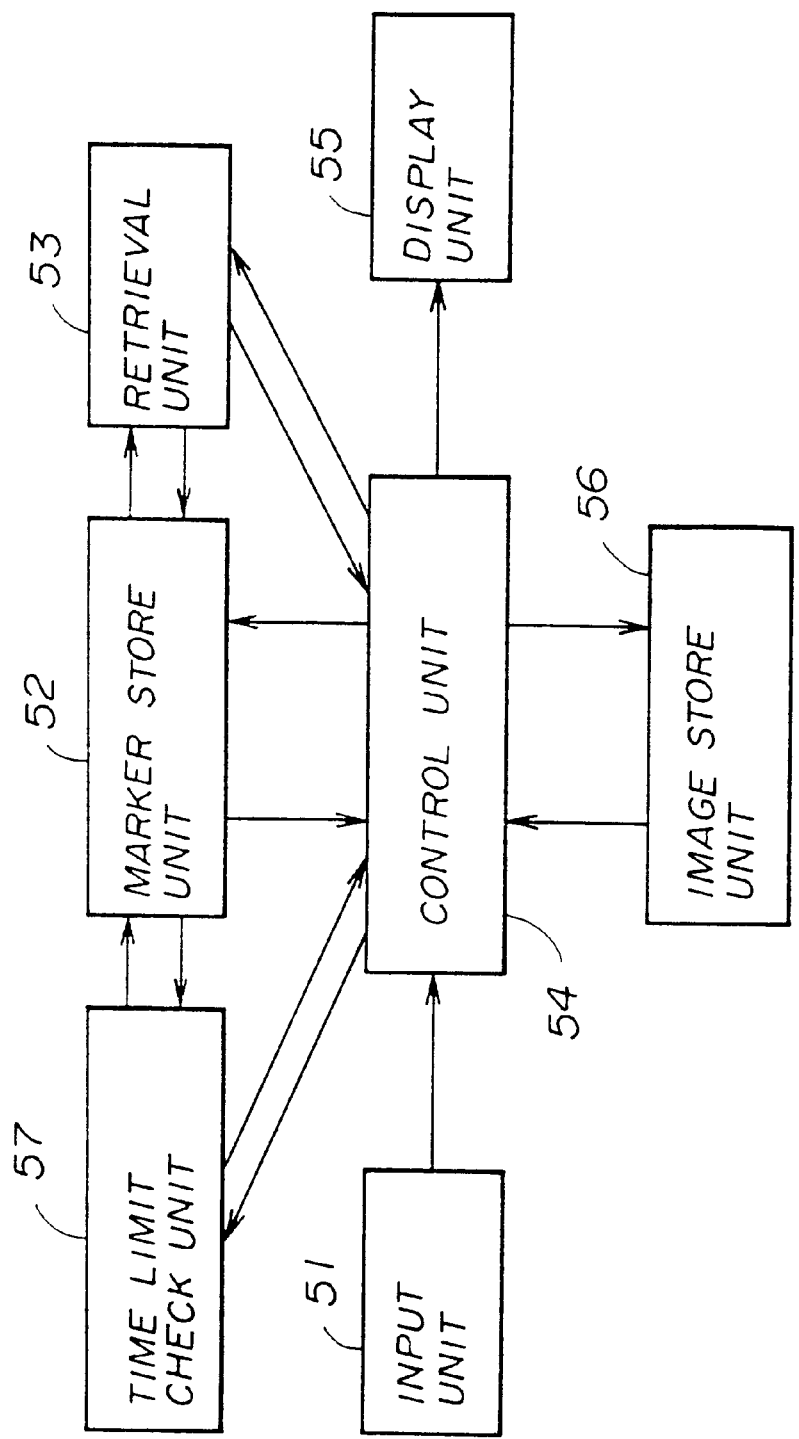
FIG. 33 shows a function block diagram of an essential part of an electronic filing apparatus according to a third embodiment of the present invention.
Figure 34:
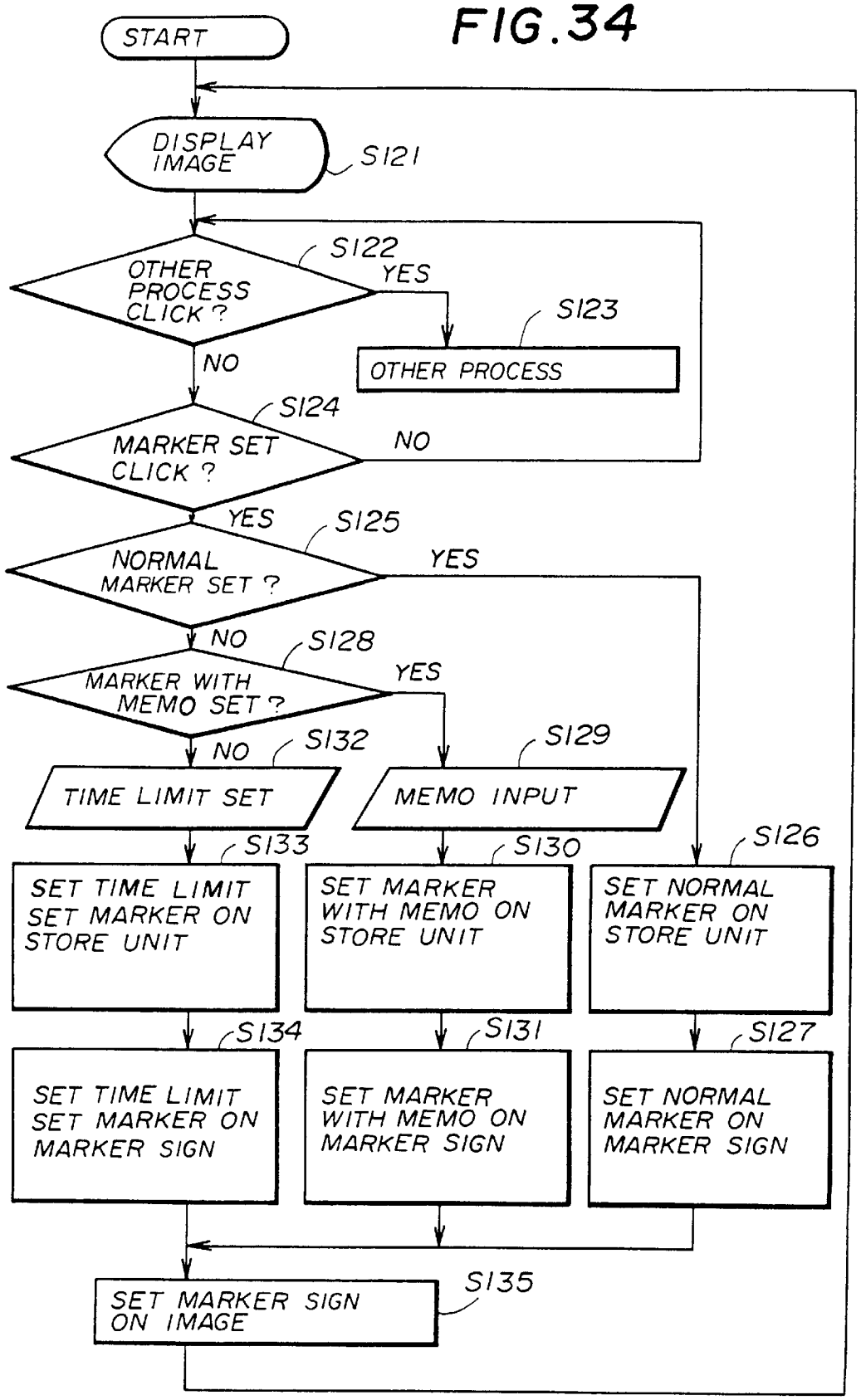
FIG. 34 shows an essential operation flow in which a marker is set, in the electronic filing apparatus shown in FIG. 33.

Further, the electronic filing apparatus according to a third embodiment of the present invention will now be described with reference to FIGS. 33, 34, and 35. The electronic filing apparatus having a time limit marker function.

Essential functions of the electronic filing apparatus will now be described with reference to FIG. 33. The electronic filing apparatus has an input unit 51, a marker storing unit 52, a retrieval unit 54, a display unit 55, an image storing unit 56, and a time limit checking unit 57.

The input unit 51 has functions for receiving: information such as characters, commands, and, having been respectively input through input devices such as a keyboard, a pointing device such as a mouse; and image information input through a scanner. The input unit 51 further receives other information such as: a marker information and retrieval information.

The marker storing unit 52 has media for storing therein information such as title information and the marker information, concerning document information and image information registered in the image storing unit 56.

The retrieval unit 53 has functions for retrieving the files of information including the image information and the document information which files of information are stored in the image storing unit 56, the retrieving being in accordance with reference information provided by the input unit 51.

The control unit 54 has functions for controlling each part constituting the system of the electronic filing apparatus.

The display unit 55 has functions for displaying: image information for the document image and the marker information, the display unit 55 having devices such as a CRT and a LCD.

The image storing unit 56, having a hard disc driving device (HDD) and/or an optical disc driving device (ODD), has functions for storing thus registered information therein such as the files of information each of the files of information respectively comprises the collection of main information and the corresponding additional information packet respectively according to the present invention. The collection of main information has the image information for the document, and the additional information packet has information for sorting/retrieving the corresponding collection of main information.

The time limit checking unit 57, when power is on in the present apparatus or when the retrieving/registering is executed therein, compares a time limit indicated by: a time limit information included in the additional information packet of each of the files of information registered in the image storing unit 56, or information of a set time-limit marker, with the current date/time. Then, as a result of the comparison, when the time limit checking unit 57 detects a file of information whose time limit is approaching the current date/time, the time limit checking unit 57 reports this detection to the control unit 54.

An operation flow of the electronic filing apparatus according to the third embodiment of the present invention, particularly with regard to the functions of the time limit marker, will now be described with reference to FIG. 34.

An image is displayed through the display unit 55, indicating the document information to be registered the document information having been input through the scanner or having been produced in the present electronic filing apparatus (S121). Then, whether or not a process other than that for setting the marker is specified through the input unit 51 (S122). Then, when the other process is specified (Yes in S122), the specified other process is executed (S123).

When, the other process is not specified (No in S122), it is determined (S124) whether or not a specification for setting the marker is specified. When the specification for setting the marker is not specified (No in S124), the processes of S122, and S123 or S124 are then repeated.

When the specification for setting the marker is specified (Yes in S124), the specification being performed using the input device of the input unit 51 such as the keyboard or the pointing device, is reported to the control unit 54.

Then, the control unit 54, in response to the above report, transfers to the marker storing unit 52 information of the document No. or the page No. where the marker is to be set in the present document information.

Then, the control unit 54 specifies display of a marker sign to which the present marker has been allocated to the display unit 55, the display unit 55 thus displaying on the screen a sign corresponding to the present marker as well as the image of the present document information on the screen.

The electronic filing apparatus according to the third embodiment of the present invention employs three categories of markers to be set on the document information. Processes for these three categories of markers will now be described successively.

It is determined (S125) whether or not the marker to be set is a normal marker. When setting of a normal marker is determined (Yes in S125), information for the normal marker is transferred to the marker storing unit 52 under the control of the control unit 54, the information being then set in the marker storing unit 52 (S126). The information for the normal marker includes information such as: the document No. and the page No. of the current document, and a kind of the set marker.

Then, the control unit 54 specifies to the display unit 55 (S127) display of a marker sign to which the normal marker sign has been allocated. Then, this marker sign, together with the image of the present document information, are displayed on the screen of the display unit 55 (S135).

When the marker determined is not the normal marker (No in S125), then it is determined (S128) whether or not a marker with a memorandum is to be set. When setting of a marker with a memorandum is determined (Yes in S128) as a result of the specification through the input unit 51, the desired memorandum contents corresponding to the marker with a memorandum are then input through the input unit 51 (S129). Then, information of the marker with a memorandum is transferred to the marker storing unit 52 under the control of the control unit 54, the information being then set in the marker storing unit 52 (S130). The information for the marker with a memorandum includes information such as: the document No. and the page No. of the current document information, a kind of the marker with a set memorandum, and the contents of the corresponding memorandum.

Then, the control unit 54 specifies to the display unit 55 (S131) display of a marker sign to which the marker with a memorandum sign has been allocated. Then, this marker sign, together with the image of the present document information, are displayed on the screen of the display unit 55 (S135).

When setting of the marker with a memorandum is not determined as a result of the specification through the input unit 51 (No in S128), information concerning a desired time limit to be specified in the time limit marker is then input through the input unit 51 (S132). Then, information of the time limit marker is transferred to the marker storing unit 52 under the control of the control unit 54, the information being then set in the marker storing unit 52 (S133). The information for the time limit marker includes information such as: the document No. and the page No. of the current document information, a kind of the set time limit marker, and the corresponding time limit.

Then, the control unit 54 specifies to the display unit 55 (S134) display of a marker sign to which the time limit marker has been allocated. Then, this marker sign, together with the image of the present document information, are displayed on the screen of the display unit 55 (S135).

Then, the file of information is registered in the image storing unit 56, the file of information having the collection of main information and the corresponding additional information packet. The collection of main information comprises the image information of the present document information, and the corresponding additional information packet includes the time limit information of the time limit marker. The additional information packet may further include other information useful for sorting/retrieving.

In the above-mentioned steps S121 through S135, the processes for setting the marker are executed in the electronic filing apparatus according to the third embodiment of the present invention.

Further, operations in the electronic filing apparatus when the current date/time is approaching the time limit will now be described with reference to FIG. 35.

In S111 it is constantly determined whether or not power is on in the present apparatus or whether or not the retrieving/registering has started therein as a result of the specification through the input unit 51. When power is on in the present apparatus or when the retrieving/registering is started (Yes in S111), the time limit checking unit 57 is started under the control of the control unit 54 (S112).

Then, the time limit checking unit 57 compares the time limit indicated by: the time limit information included in the additional information packet of each of the files of information registered in the image storing unit 56, or information of the time limit marker set on the marker storing unit 52 with the current date/time (S113). Then, as a result of the comparison, when the time limit checking unit 57 detects a file of information with time limit that is approaching the current date/time (Within time limit in S113), for example, within one week thereof, the time limit checking unit 57 reports this detection to the control unit 54.

The control unit 54, in response to the report, reads a part of the present file of information from the image storing unit 56, the control unit 54 then causing the display unit 55 to constantly display the part of the present file of information (S114). When, the current date/time is not within a specified time limit range (Out of time limit in S113), nothing is executed, the current processes being then finished.

Therefore, the user can become aware that the current date/time is approaching the specified time limit when display of a certain image on the screen occurs as a result of power being turned on or the retrieval/sorting being started.

Thus, the user needs not be concerned regarding corresponding time limit for a file of information until the current date/time that is approaching the specified time limit. Further, when the current date/time is approaching the time limit, this status is automatically displayed on the screen. Thus, the user can use the present filing system free of anxiety concerning dead lines.

Further, as a result of the corresponding time limit having been specified on the time limit marker included in the corresponding additional information of the file of information, the time limit marker indicating that the time limit is set is displayed when the corresponding collection of main information of the file of information may be displayed, even when the current date/time has not become close the corresponding time limit. As a result of the display of the time limit marker, the user can acknowledge that the present file of information has the corresponding time limit set therefor. Therefore, the user need not be anxious as to whether or not the present file of information has a corresponding time limit set therefor. Further, such a time limit marker may be utilized for a purpose other than the time limit managing function, so that a time limit marker may be used, similarly to that an general marker, such as a book marker, is used. That is, a time limit marker is utilized for retrieving file of information having the time limit marker attached thereto, or for retrieving a certain page of the document of the file of information, which page has the time limit marker attached thereto.

Further, the present invention is not limited to the above described embodiments, and variations and modifications may be made without departing from the scope of the present invention.

What is claimed is:

1. A computer-implemented information processing method comprising:

(a) inputting without operator assistance sensory information data into the computer;

(b) detecting said sensory information data representing a human being's sensory impressions of circumstances relating to a processing of a collection of main information;

(c) producing, within the computer, an additional-information item including the sensory information data which was input in the inputting step; and (d) attaching, using the computer, said additional-information item to the collection of main information.

2. The information processing method according to claim 1, wherein said attaching step includes:

producing a file of information having said collection of main information and said additional-information item.

3. The information processing method of claim 1, further comprising:

sorting a plurality of collections of main information, each of the plurality of collections of main information having a respective additional-information item attached thereto, wherein each of the additional-information items has sensory information data corresponding to a sensory impression of a human being with respect to respective circumstances relating to processing of the respective collections of main information.

4. The information processing method of claim 1, further comprising:

sorting a collection of main information, the sorting being based on sorting information provided in an additional-information item attached to the collection of main information, the additional-information item having sorting information indicating a manner in which the corresponding collection of main information has been previously sorted.

5. The method of claim 1, wherein the human being's sensory impressions of circumstances are the human being's sensory impressions of intrinsic circumstances.

6. A computer-implemented information processing apparatus comprising:

input means for inputting into the computer without operator assistance, sensory information data representing a human being's sensory impressions of circumstances relating to a processing of a collection of main information;

forming means for forming, within the computer, an additional-information item which includes the sensory information data; and attaching means for attaching the additional-information item to the collection of main information within the computer;

wherein the additional-information item includes, in addition to the sensory information data, processed manner information which indicates a manner in which the corresponding collection of main information has been processed.

7. The information processing apparatus according to claim 6, wherein the processed-manner information comprises apparatus information concerning said information processing apparatus having processed the corresponding collection of main information.

8. The information processing apparatus of claim 6, further comprising:

searching means for searching for a collection of main information from among a plurality of collections of main information, wherein each collection of said plurality of collections of main information has a respective additional-information item, each of the additional information items has position information regarding a position corresponding to a respective collection of main information, in a respective corresponding reference coordinate plane, and said searching means includes means for searching for the collection of main information with reference to the corresponding coordinate information of the respectively corresponding additional-information item.

9. The apparatus of claim 6, wherein the human being's sensory impressions of circumstances are the human being's sensory impressions of intrinsic circumstances.

10. A computer-implemented information processing method comprising:

(a) inputting into the computer without operator assistance, sensory information data, representing a human being's sensory impressions of circumstances relating to a processing of a collection of main information;

(b) producing within the computer an additional-information item having processed-manner information that indicates a manner in which the corresponding collection of main information has been processed; and (c) using the computer, attaching said additional-information item to said collection of main information.

11. The information processing method according to claim 10, wherein the processed-manner information comprises sorting information indicating a manner in which the corresponding collection of main information has been previously sorted.

12. The information processing method according to claim 10, wherein the processed-manner information comprises history information indicating how the corresponding collection of main information has been revised.

13. The information processing method according to claim 10, wherein the processed-manner information comprises application-software specifying information for specifying an application-software by which the corresponding collection of main information has been processed.

14. The information processing method according to claim 10, further comprising:

(h) coding of the collection of main information, wherein the processed-manner information comprises decoding information for decoding said coded collection of main information.

15. The method of claim 10, wherein the human being's sensory impressions of circumstances are the human being's sensory impressions of intrinsic circumstances.

16. A computer-implemented processing method comprising:

(a) inputting without operator assistance into the computer sensory information data, detected by the computer, representing a human being's sensory impressions of circumstances relating to a processing of a collection of main information;

(b) producing an additional-information item within the computer, including both (1) the sensory information data as well as (2) processing control information used for controlling a manner in which a corresponding collection of main information will be processed; and (c) using the computer, attaching said additional-information item to said collection of main information.

17. The information processing method according to claim 16, wherein the processing-control information comprises output controlling information for controlling outputting of a collection of main information.

18. The information processing method according to claim 17, wherein the output controlling information comprises rank information for controlling each of collections of a plurality of collections of main information depending on respective ranks of the collections among the plurality of collections of main information, the respective ranks having been previously assigned to respective collections in the plurality of collections of main information.

19. The information processing method according to claim 17, wherein said output controlling information comprises a password.

20. The information processing method according to claim 16, wherein said processing-control information comprises revising control information for controlling revision of a collection of main information.

21. The information processing method according to claim 16, wherein said processing-control information comprises delete control information for controlling deletion of part or all of a collection of main information.

22. The method of claim 16, wherein the human being's sensory impressions of circumstances are the human being's sensory impressions of intrinsic circumstances.

23. A computer-implemented processing apparatus comprising:

input means for inputting without operator assistance into the computer sensory information data, detected by the processing apparatus, representing a human being's sensory impressions of circumstances relating to a processing of a collection of main information;

forming means for forming within the computer, an additional-information item which includes the sensory information data;

attaching means for attaching the additional-information item to a corresponding collection of main information in the computer; and additional-information item processing means for processing the additional-information item within the computer after it has been attached to the corresponding collection of main information.

24. The information processing apparatus according to claim 23, wherein said additional-information item processing means comprises additional-information item controlling means for controlling a sequence of elements of the additional information item and an increase and a decrease in a number of said elements of the additional-information item.

25. The information processing apparatus according to claim 23, wherein said additional-information item element-processing means executes one of: sorting elements of the respective additional-information item, and linking elements of said respective additional-information items; said elements of the additional information items respectively having identification codes, said identification codes indicating the respective collections of main information.

26. The information processing apparatus according to claim 23, wherein said additional-information item processing means comprises additional-information item reconstructing means for reconstructing the respective additional-information items, the reconstructing of the respective additional-information items occurring as a result of searching for elements of the additional-information items according to specified reference information and as a result of grouping the elements found by said searching, the grouping being executed by using identification codes previously attached to the elements, said identification codes indicating each collection of the plurality of collections of main information respectfully.

27. The information processing apparatus according to claim 26, further comprising ranking means for ranking reconstructed additional-information items according to the degree of similarity between elements of the specified reference information and elements of each of said reconstructed additional-information items.

28. The apparatus of claim 23, wherein the human being's sensory impressions of circumstances are the human being's sensory impressions of intrinsic circumstances.

29. A computer-implemented information processing apparatus comprising:

input means for inputting without operator assistance into the computer, sensory information data representing a human being's sensory impressions of circumstances relating to a processing of a collection of main information;

forming means for forming, in the computer, an additional-information item which includes the sensory information data;

attaching means for attaching additional-information items to respective collections of main information within the computer;

wherein said additional-information items further include respective coordinate information indicating coordinates, in a reference coordinate plane, corresponding to the respective collections of main information; and searching means for conducting a search within the computer in said plurality of collections of main information with reference to the coordinate information in the additional-information items which indicates said respective coordinates.

30. The apparatus of claim 29, wherein the human being's sensory impressions of circumstances are the human being's sensory impressions of intrinsic circumstances.

31. An information processing method, comprising the computer-implemented steps of:

detecting without operator assistance, a physical attribute of a document, apart from intended information content recorded on the document, representing a human being's sensory impressions of the circumstances relating to a processing of a collection of the intended information;

producing an additional-information item including the sensory information data; and attaching said additional-information item to the collection of intended information.

* * * * *